United States Patent [19]
Limberg

[11] Patent Number: 5,801,759
[45] Date of Patent: Sep. 1, 1998

[54] DIGITAL TV RECEIVER CIRCUITRY FOR DETECTING AND SUPPRESSING NTSC CO-CHANNEL INTERFERENCE

[75] Inventor: Allen L.R. Limberg, Vienna, Va.

[73] Assignee: Samsung Electronics Co., Ltd., Suwon, Rep. of Korea

[21] Appl. No.: 882,539

[22] Filed: Jun. 25, 1997

Related U.S. Application Data

[63] Continuation-in-part of Ser. No. 839,691, Apr. 15, 1997.

[51] Int. Cl.[6] .................................................. H04N 5/38
[52] U.S. Cl. ........................... 348/21; 348/607; 348/725
[58] Field of Search ............................ 348/21, 607, 470, 348/555, 725, 726, 706; 375/346, 348, 350

[56] References Cited

U.S. PATENT DOCUMENTS

| | | | |
|---|---|---|---|
| 5,325,188 | 6/1994 | Scarpa | 348/725 |
| 5,325,204 | 6/1994 | Scarpa | 348/607 |
| 5,506,636 | 4/1996 | Patel et al. | 348/725 |
| 5,546,132 | 8/1996 | Kim et al. | 348/21 |
| 5,594,496 | 1/1997 | Nielsen et al. | 348/21 |
| 5,602,602 | 2/1997 | Hulyalkar | 348/607 |
| 5,666,170 | 9/1997 | Stewart | 348/726 |

*Primary Examiner*—Victor R. Kostak

[57] ABSTRACT

Symbol decoding results obtained using comb filtering to suppress artifacts of NTSC co-channel interference before symbol decoding and symbol decoding results obtained without using such comb filtering before symbol decoding are compared for determining which symbol decoding results are to be selected as final symbol decoding results. Symbol decoding results obtained using comb filtering to suppress artifacts of NTSC co-channel interference are selected as final symbol decoding results when NTSC co-channel interference occurs. The digital television signals are detected to determine whether 4.5 MHz NTSC intercarrier obtains, in order to confirm the occurrence of substantial NTSC co-channel interference.

15 Claims, 8 Drawing Sheets

A, B AND C ARE RESPECTIVE INTEGERS OF DIFFERENT VALUES SELECTED FROM 1, 2, 3, 4 & 5

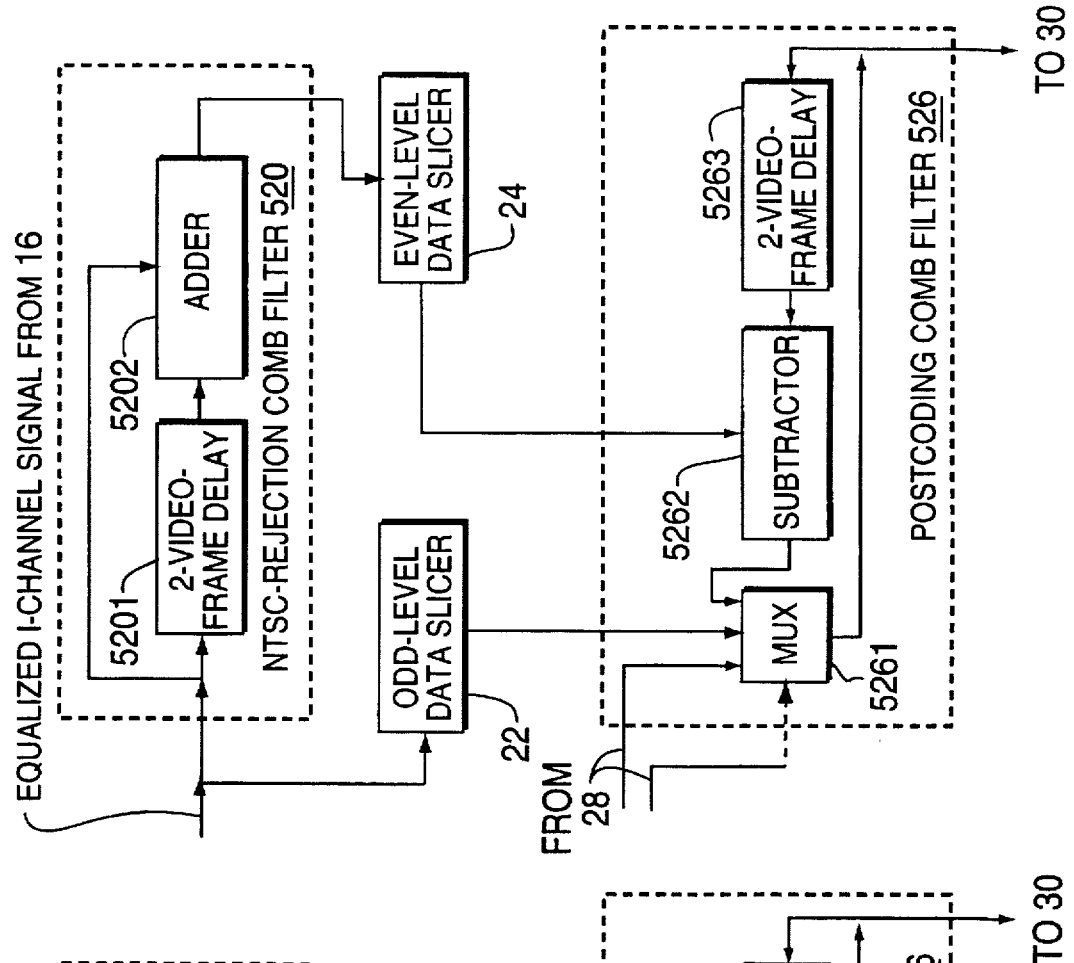
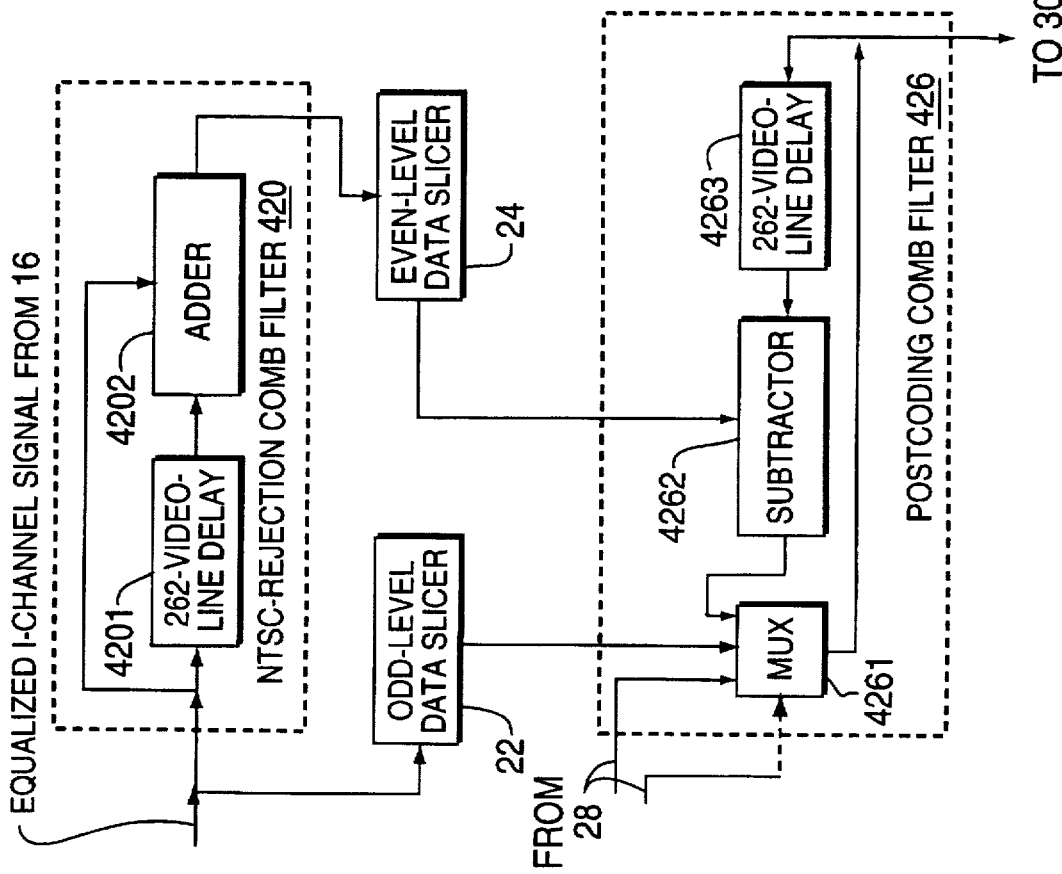
FIG. 7
FIG. 6

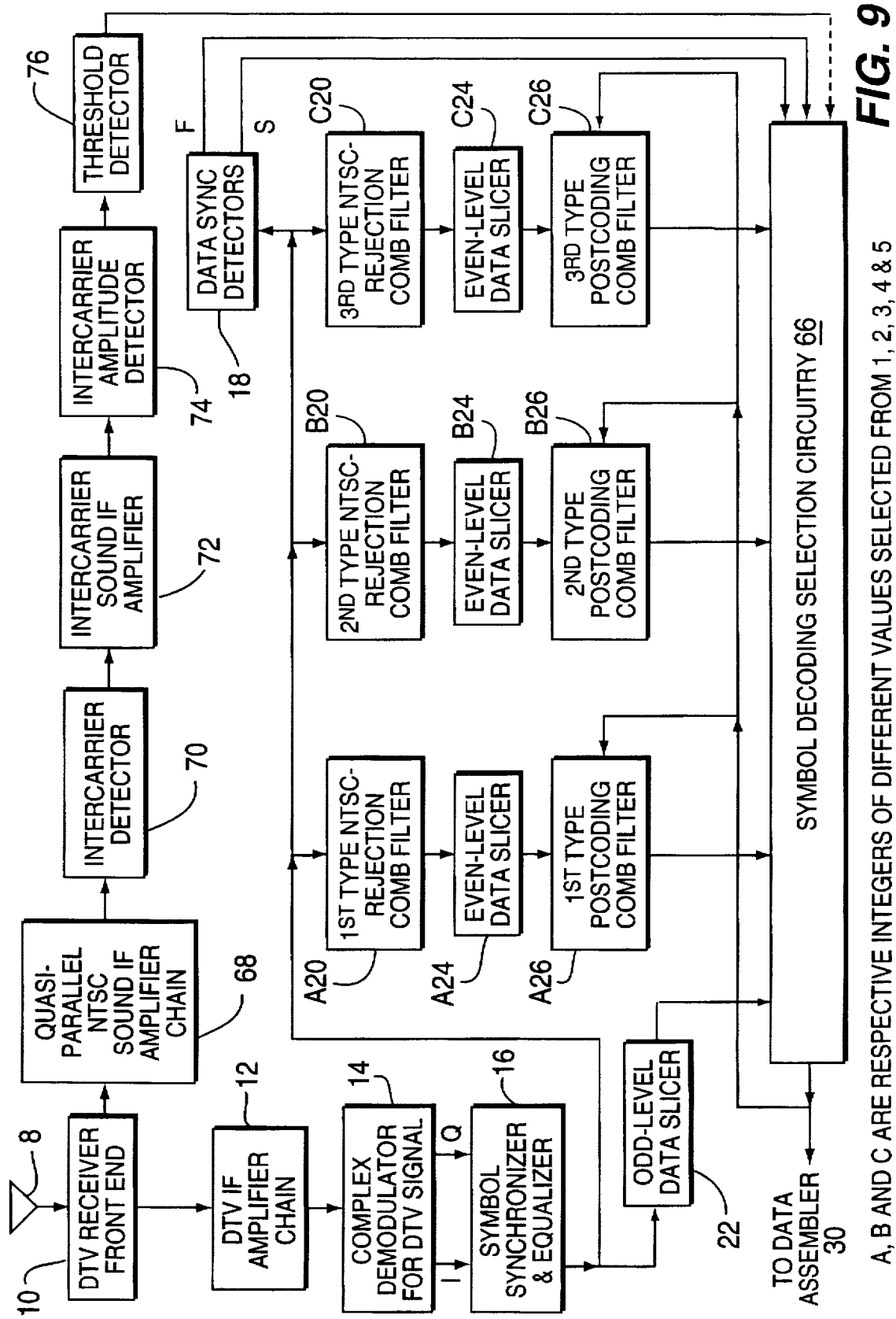

DIGITAL TV RECEIVER CIRCUITRY FOR DETECTING AND SUPPRESSING NTSC CO-CHANNEL INTERFERENCE

This is a continuation-in-part of U.S. patent application Ser. No. 08/839,691 filed Apr. 15, 1997.

The present invention relates to digital television systems, such as the digital high-definition television (HDTV) system used for terrestrial broadcasting in the United States of America in accordance with the Advanced Television Systems Committee (ATSC) standard, and more particularly, to digital television receivers with circuitry for detecting co-channel interference from analog television signals, such as those conforming to the National Television Systems Committee (NTSC) standard.

BACKGROUND OF THE INVENTION

A Digital Television Standard published Sep. 16, 1995 by the Advanced Television Systems Committee (ATSC) specifies vestigial sideband (VSB) signals for transmitting digital television (DTV) signals in 6-MHz-bandwidth television channels such as those currently used in over-the-air broadcasting of National Television Systems Committee (NTSC) analog television signals within the United States. The VSB DTV signal is designed so its spectrum is likely to interleave with the spectrum of a co-channel interfering NTSC analog TV signal. This is done by positioning the pilot carrier and the principal amplitude-modulation sideband frequencies of the DTV signal at odd multiples of one-quarter the horizontal scan line rate of the NTSC analog TV signal that fall between the even multiples of one-quarter the horizontal scan line rate of the NTSC analog TV signal, at which even multiples most of the energy of the luminance and chrominance components of a co-channel interfering NTSC analog TV signal will fall. The video carrier of an NTSC analog TV signal is offset 1.25 MHz from the lower limit frequency of the television channel. The carrier of the DTV signal is offset from such video carrier by 59.75 times the horizontal scan line rate of the NTSC analog TV signal, to place the carrier of the DTV signal about 309,877.6 kHz from the lower limit frequency of the television channel. Accordingly, the carrier of the DTV signal is about 2,690122.4 Hz from the middle frequency of the television channel.

The exact symbol rate in the Digital Television Standard is (684/286) times the 4.5 MHz sound carrier offset from video carrier in an NTSC analog TV signal. The number of symbols per horizontal scan line in an NTSC analog TV signal is 684, and 286 is the factor by which horizontal scan line rate in an NTSC analog TV signal is multiplied to obtain the 4.5 MHz sound carrier offset from video carrier in an NTSC analog TV signal. The symbol rate is $10,762,238*10^6$ symbols per second, which can be contained in a VSB signal extending 5.381119 MHz from DTV signal carrier. That is, the VSB signal can be limited to a band extending 5.690997 MHz from the lower limit frequency of the television channel.

The ATSC standard for digital HDTV signal terrestrial broadcasting in the United States of America is capable of transmitting either of two high-definition television (HDTV) formats with 16:9 aspect ratio. One HDTV display format uses 1920 samples per scan line and 1080 active horizontal scan lines per 30 Hz frame with 2:1 field interlace. The other HDTV display format uses 1280 luminance samples per scan line and 720 progressively scanned scan lines of television image per 60 Hz frame. The ATSC standard also accommodates the transmission of DTV display formats other than HDTV display formats, such as the parallel transmission of four television signals having normal definition in comparison to an NTSC analog television signal.

DTV transmitted by vestigial-sideband (VSB) amplitude modulation (AM) during terrestrial broadcasting in the United States of America comprises a succession of consecutive-in-time data fields each containing 313 consecutive-in-time data segments. The data fields may be considered to be consecutively numbered modulo-2, with each odd-numbered data field and the succeeding even-numbered data field forming a data frame. The frame rate is 20.66 frames per second. Each data segment is of 77.3 microseconds duration. So, with the symbol rate being 10.76 MHz there are 832 symbols per data segment. Each segment of data begins with a line synchronization code group of four symbols having successive values of +S, −S, −S and +S. The value +S is one level below the maximum positive data excursion, and the value −S is one level above the maximum negative data excursion. The initial line of each data field includes a field synchronization code group that codes a training signal for channel-equalization and multipath suppression procedures. The training signal is a 511-sample pseudo-random noise sequence (or "PN-sequence") followed by three 63-sample PN sequences. The middle ones of the 63-sample PN sequences in the field synchronization codes are transmitted in accordance with a first logic convention in the first line of each odd-numbered data field and in accordance with a second logic convention in the first line of each even-numbered data field, the first and second logic conventions being one's complementary respective to each other.

The data within data lines are trellis coded using twelve interleaved trellis codes, each a ⅔ rate trellis code with one uncoded bit. The interleaved trellis codes are subjected to Reed-Solomon forward error-correction coding, which provides for correction of burst errors arising from noise sources such as a nearby unshielded automobile ignition system. The Reed-Solomon coding results are transmitted as 8-level (3 bits/symbol) one-dimensional-constellation symbol coding for over-the-air transmission, which transmissions are made without symbol precoding separate from the trellis coding procedure. The Reed-Solomon coding results are transmitted as 16-level (4-bits/symbol) one-dimensional-constellation symbol coding for cablecast, which transmissions are made without preceding. The VSB signals have their natural carrier wave, which would vary in amplitude depending on the percentage of modulation, suppressed.

The natural carrier wave is replaced by a pilot carrier wave of fixed amplitude, which amplitude corresponds to a prescribed percentage of modulation. This pilot carrier wave of fixed amplitude is generated by introducing a direct component shift into the modulating voltage applied to the balanced modulator generating the amplitude-modulation sidebands that are supplied to the filter supplying the VSB signal as its response. If the eight levels of 4-bit symbol coding have normalized values of −7, −5, −3, −1, +1, +3, +5 and +7 in the carrier modulating signal, the pilot carrier has a normalized value of 1.25. The normalized value of +S is +5, and the normalized value of −S is −5.

In the earlier development of the DVT art it was contemplated that the DTV broadcaster might be called upon to decide whether or not to use a symbol precoder at the transmitter, which symbol precoder would follow the symbol generation circuitry and provide for precoded filtering of symbols. This decision by the broadcaster would have depended upon whether interference from a co-channel NTSC broadcasting station were expected or not. The symbol precoder would complement the symbol postcoding incidentally introduced in each DTV receiver by a comb filter used before the data-slicer in the symbol decoder circuitry to reject artifacts of NTSC co-channel interfering signal. Symbol precoding would not have been used for data line synchronization code groups or during data lines in which data field synchronization data were transmitted.

Co-channel interference is reduced at greater distances from the NTSC broadcasting station(s) and is more likely to occur when certain ionospheric conditions obtain, the summertime months during years of high solar activity being notorious for likelihood of co-channel interference. Such interference will not occur if there are no co-channel NTSC broadcasting stations, of course. If there were likelihood of NTSC interference within his area of broadcast coverage, it was presumed that the HDTV broadcaster would use the symbol precoder to facilitate the HDTV signal being more easily separated from NTSC interference; and, accordingly, a comb filter would be employed as symbol postcoder in the DTV receiver to complete matched filtering. If there were no possibility of NTSC interference or there were insubstantial likelihood thereof, in order that noise have a flat frequency spectrum less likely to cause erroneous decisions as to symbol values in the trellis decoder, it was presumed that the DTV broadcaster would discontinue using the symbol precoder; and, accordingly, the symbol postcoder would then be disabled in each DTV receiver. Without the broadcaster being aware of the condition, actual co-channel NTSC interference can be substantial for portions of the reception area for a broadcast, owing to freakish skip conditions, owing to cablecast leakage, owing to inadequate intermediate-frequency image suppression in NTSC receivers, owing to magnetic tape used for digital television recording having remnant previous analog television recording, or owing to some other unusual condition.

U.S. Pat. No. 5,594,496 issued Jan. 14, 1997 to Nielsen et alii and entitled "DETECTION OF CO-CHANNEL INTERFERENCE IN DIGITAL TELEVISION SIGNALS" describes an NTSC co-channel interference detector in which data segments containing field synchronization codes are subjected to data field comb filtering to obtain a data field comb filter response with periodic intervals free from symbol coding in which received noise and co-channel interference can be evaluated. The data field comb filter response during these periodic intervals is compared with that response as subjected to further comb filtering that suppresses artifacts of NTSC co-channel interference. If the further comb filtering results in appreciable reduction in signal level, the signal is presumed to be comprise substantial artifacts of NTSC co-channel interference, and comb filtering to suppress artifacts of NTSC co-channel interference is employed before symbol decoding. If the further comb filtering does not result in appreciable reduction in detected noise, the noise is presumed to be primarily Johnson noise, and symbol decoding is done without previously employing comb filtering to suppress artifacts of NTSC co-channel interference. This is because comb filtering in which differentially delayed symbol coding is linearly combined is associated with a 3 dB or so increase in Johnson noise.

The current ATSC DTV standard does not authorize the transmitter to use symbol precoding. The suppression of co-channel interfering analog TV signal is presumed to be carried out in the trellis decoding process, after the data-slicing procedures associated with symbol decoding. This procedure avoids the problem of determining whether or not precoding is done at the transmitter. However, co-channel interfering analog TV signal undesirably introduces errors into the data-slicing processes, which places more burden on the error-correction decoding procedures, trellis decoding and Reed-Solomon decoding. These errors will reduce the broadcast coverage area, which may lose revenue for the commercial DTV broadcaster. So, providing for the suppression of co-channel interfering analog TV signal before data-slicing is still desirable, despite symbol preceding at the DTV transmitter not being authorized by the current ATSC DTV standard.

The term "linear combination" refers generically to addition and to subtraction, whether performed in accordance with a conventional arithmetic or a modular arithmetic. The term "modular combination" refers to linear combination carried performed in accordance with a modular arithmetic. That type of coding that re-codes a digital symbol stream through differential delay and linear combination of the differentially delayed terms, exemplified by the symbol postcoding used in prior-art HDTV receivers, is defined as "symbol re-coding of first type" in this specification. That type of coding that re-codes a digital symbol stream through its modular combination with delayed result of the modular combination, exemplified by the symbol precoding used in prior-art HDTV transmitters, is defined as "symbol re-coding of second type" in this specification.

The problem of co-channel interference from analog television signals can be viewed from the standpoint of being a sometime jamming problem at the receiver, to be solved by adaptive filter circuitry in the receiver. So long as the dynamic range of the system channel is not exceeded, so that the co-channel interference can capture the system channel by destroying signal transmission capability for DTV modulation, the performance of the system can be viewed as a superposition of signals problem. The filter circuitry in the receiver is adapted for selecting the digital signal from the co-channel interference caused by the analog television signals, relying on the pronounced correlation and anti-correlation properties of the analog television signals to reduce their energy sufficiently as to capture the system channel from them.

Insofar as the co-channel interference from analog television signals is concerned, it enters the system channel after the DTV transmitter and before the DTV receiver. The use or non-use of symbol preceding at the DTV transmitter has no effect on the co-channel interference from analog television signals. At the DTV receiver, so long as the co-channel interference is not so large as to overload the receiver front-end and capture the system channel, it is advantageous to precede the data-slicing circuitry with a comb filter for reducing the energy of higher-energy spectral components of the co-channel interference, thus to reduce the errors occurring during data-slicing. The DTV broadcaster should adjust his carrier frequency, which is nominally 310 KHz above the lower limit frequency of the television channel assignment, so that his carrier frequency is optimally offset in frequency from the video carrier of a co-channel NTSC analog TV signal that is likely to interfere. This optimal offset in carrier frequency is exactly 59.75 times the horizontal scan line frequency $f_H$ of the NTSC analog TV signal. The artifacts of the co-channel interference in the demodulated DTV signal will then include beats at 59.75 times the horizontal scan line frequency $f_H$ of the NTSC analog TV signal, generated by heterodyne between the digital HDTV carrier and the video carrier of the co-channel interfering analog TV signal, and beats at 287.25 times $f_H$ generated by heterodyne between the digital HDTV carrier and the chrominance subcarrier of the co-channel interfering analog TV signal, which beats are quite close in frequency to the fifth harmonic of the beats at 59.75 times $f_H$. The artifacts will further include beats at approximately 345.75 times $f_H$, generated by heterodyne between the digital HDTV carrier and the audio carrier of the co-channel interfering analog TV signal, which beats are quite close in frequency to the sixth harmonic of the beats at 59.75 times $f_H$. The nearly harmonic relationship of these beats allows them all to be suppressed by a single properly designed comb filter incorporating only a few symbol epochs of differential delay. The use of an NTSC-rejection comb filter before data-slicing in the DTV receiver incidentally performs symbol re-coding of first type, to modify the symbols obtained by data-slicing.

The data-slicing operation that follows this symbol re-coding of first type in the DTV receiver is a quantizing process that is not destructive of the symbols resulting from the symbol re-coding of first type, insofar as the transmission of data is concerned, since the data quantization levels are designed to match the symbol levels. The quantization discriminates against the co-channel interfering analog TV signal remnants that remain after the filtering associated with symbol re-coding of first type and that are appreciably smaller than steps between symbol code levels, however. This is a species of the capture phenomenon in which phenomenon a stronger signal gains at the expense of a weaker one in a quantizing process.

Insofar as the transmission of data is concerned, the digital data symbol stream flows through the full length of the system channel. When symbol re-coding of second type is done as symbol precoding at the DTV transmitter, the additive combination of the differentially delayed data symbol streams is done on a modular basis that does not boost transmitter power or increase average intersymbol distance to help further in overcoming jamming analog TV signal. Instead, the principal mechanism for overcoming jamming analog TV signal is its attenuation vis-a-vis DTV signal, as provided by the comb filtering at the DTV receiver, causing the remnant analog TV signal in the comb filter response to be suppressed by the quantizing effects in the data-slicer that immediately follows the comb filter.

The order of performing symbol re-coding procedures of first and second types has no appreciable effect on signal transmission through the system channel under such circumstances, since neither coding scheme destroys signal transmission capability for the symbol stream. The order of performing symbol re-coding procedures of first and second types has no appreciable affect on the capability of the digital receiver to suppress co-channel interfering analog TV signal, as long as symbol re-coding of the second type is not interposed between symbol re-coding of the first type and the subsequent data-slicing.

These insights provide the general foundation on which the inventor based apparatus described in U.S. patent application Ser. No. 08/839,691 filed Apr. 15, 1997 and entitled "DIGITAL TELEVISION RECEIVER WITH ADAPTIVE FILTER CIRCUITRY FOR SUPPRESSING NTSC CO-CHANNEL INTERFERENCE". The adaptive filter circuitry receives for symbol decoding a stream of 2N-level symbols susceptible to being accompanied by artifacts of co-channel interfering analog television signal, N being a positive integer. In this adaptive filter circuitry NTSC co-channel interference is detected, and it is determined whether this NTSC co-channel interference has sufficient energy to introduce uncorrectable errors into the data-slicing procedure used to perform symbol decoding directly on the baseband signal recovered by synchronously detecting the VSB-AM DTV signal. If the NTSC co-channel interference is determined not to have sufficient energy to cause uncorrectable errors, the baseband signal is symbol decoded using a first data slicer to generate symbol decoding results. If the NTSC co-channel interference is determined to have sufficient energy to cause uncorrectable errors, the baseband signal is filtered by a first comb filter, to reduce the energy of the co-channel interference before being symbol decoded using a second data slicer. The first comb filter incidentally carries out a symbol re-coding procedure of first type that introduces error into the symbol decoding results generated by the second data-slicer. This symbol re-coding procedure of first type carried out before data-slicing by the second data-slicer is viewed as a precoding procedure insofar as the adaptive filtering for suppressing NTSC co-channel interference is concerned. A second comb filter carries out a symbol re-coding procedure of second type after the data-slicing by the second data-slicer, implementing a postcoding procedure to compensate for the symbol re-coding procedure of first type and generate symbol decoding results.

The symbol re-coding procedure of first type re-codes an input symbol stream of through differential delay and first linear combination of the differentially delayed terms. The symbol re-coding procedure of second type re-codes partially-filtered symbol decoding results recovered by the second data-slicer. This symbol re-coding procedure of second type utilizes second linear combination of the partially-filtered symbol decoding results with previous symbol decoding results fed back with delay similar to the differential delay introduced into the input symbol stream, which second linear combination is performed in accordance with a modulo-2N arithmetic to generate postcoded symbol decoding results. Running errors in postcoded symbol decoding results are curtailed by forcing the symbol decoding results to conform to ideal symbol decoding results drawn from memory in the DTV receiver during times data field synchronization information and data segment synchronization information occur. One of the first and second linear combinations is subtractive, and the other is additive.

The invention concerns determining when the final symbol decoding results are more likely to be correct based on estimates selected from the postcoded symbol decoding results obtained after comb filtering to suppress NTSC co-channel interference, rather than on estimates selected from the interim symbol decoding results obtained by data-slicing the baseband symbol code without its having been comb filtered to suppress NTSC co-channel interference. This determination is made by comparing each postcoded symbol decoding result to a corresponding interim symbol decoding result throughout each data segment. Substantial departure of a postcoded symbol decoding result from the corresponding interim symbol decoding result is presumed to arise owing to the presence of NTSC artifacts in the baseband symbol code, so postcoded symbol decoding results are selected in preference to interim decoding results for inclusion in final symbol decoding results, unless other information indicates such selection would probably be erroneous.

SUMMARY OF THE INVENTION

A digital television signal receiver includes digital television signal detection apparatus for supplying a stream of 2N-level symbols each having a symbol epoch of a specified length in time, N being a positive integer, which stream of 2N-level symbols is susceptible to being accompanied by artifacts of co-channel interfering analog television signal. The symbols are grouped into successive data segments with respective headers of data segment synchronization code, and the data segments are grouped into successive data fields with the initial data segment of each data field containing a data field synchronization code, which changes from data field to data field. The digital television signal receiver includes circuitry for providing a number M of unique comb filter responses to the stream of 2N-level symbols, each said unique comb filter response being less susceptible to being accompanied by artifacts of co-channel interfering analog television signal than the stream of 2N-level symbols. A plurality of symbol decoders are included in the digital television signal receiver for generating respective estimated symbol decoding results. A first of this plurality of symbol decoders generates first estimated symbol decoding results directly responsive to the stream of 2N-level symbols. Each other of the plurality of symbol decoders generates respective estimated symbol decoding results responsive to a respective one of the M unique comb filter responses, which respective estimated symbol decoding results are postcoded to complete a respective matched filtering for the respective one of said M unique comb filter responses from which those respective estimated symbol decoding results are obtained. Besides said first symbol decoder, the plurality of symbol decoders includes at least a second symbol decoder for generating second estimated symbol decoding results. In accordance with the invention the digital television signal receiver includes circuitry for detecting whether or not there currently is departure between said first and second estimated symbol decoding results and includes best-estimate-selection circuitry for selecting best estimates from the respective estimated symbol decoding results to generate final symbol decoding results at times between those times when synchronization codes occur. The selection of the best estimates by the best-estimate-selection circuitry depends on the current departure from the first estimated symbol decoding results of each other estimated symbol decoding results.

In one embodiment of the invention M is two, the plurality of symbol decoders including besides said first symbol decoder only a second symbol decoder for generating second estimated symbol decoding results. The best-estimate-selection circuitry takes the following form in this embodiment of the invention. A multiplexer is connected to provide the capability of selecting between the first and second estimated symbol decoding results for generating final symbol decoding results at times between those times when synchronization codes occur. There is a squarer for the departures between the first and second estimated symbol decoding results, for developing squaring results as an absolute measure of those departures, and a mean averager for generating the mean average of said squaring results. A threshold detector responds to the mean average of the squaring results exceeding a prescribed threshold value for conditioning the multiplexer for selecting the second estimated symbol decoding results to generate the final symbol decoding results at times between those times when said synchronization codes occur, and otherwise conditions the multiplexer for selecting the first estimated symbol decoding results to generate the final symbol decoding results at times between those times when synchronization codes occur.

BRIEF DESCRIPTION OF THE DRAWING

FIG. 6 is a block schematic diagram showing details of a portion of the FIG. 1 digital television signal receiver when the NTSC-rejection comb filter employs a 262-video-line delay.

FIG. 7 is a block schematic diagram showing details of a portion of the FIG. 1 digital television signal receiver when the NTSC-rejection comb filter employs a 2-video-frame delay.

FIG. 9 is a block schematic diagram showing a digital television signal receiver using a plurality of NTSC-rejection comb filters for performing parallel symbol decoding.

FIG. 10 is an assembly diagram showing how FIGS. 10A and 10B can be fitted together to form a single figure referred to as FIG. 10 in the detailed description that follows, which FIG. 10 shows details of symbol code selection circuitry that can be used in a digital television signal receiver of the type shown in FIG. 9.

DETAILED DESCRIPTION

Figure 1:
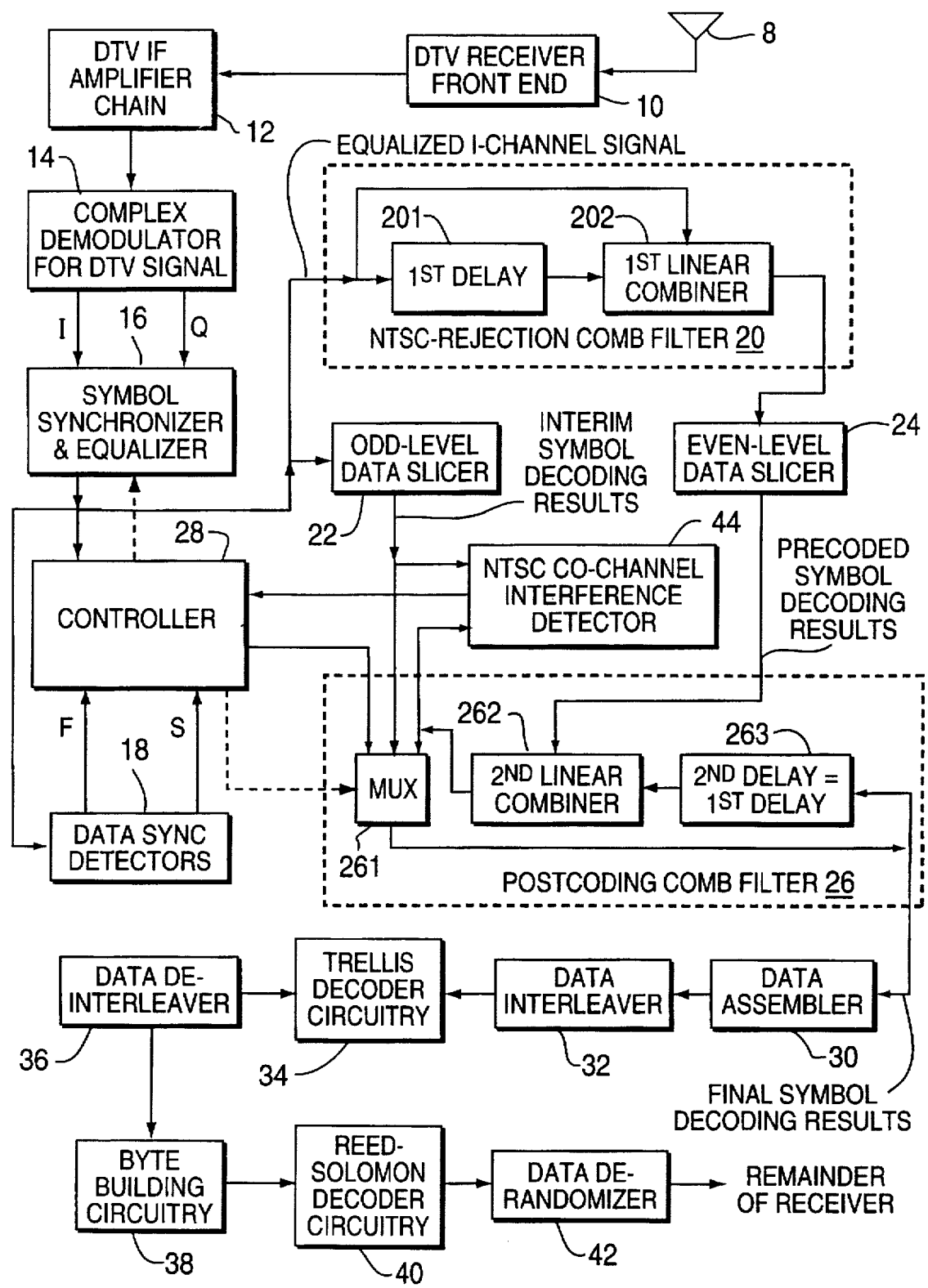
FIG. 1 is a block schematic diagram of a digital television signal receiver using an NTSC-rejection comb filter before symbol decoding and a postcoding comb filter after symbol decoding and, in accordance with the invention, using a co-channel interference detector that compares the symbol decoding results obtained without taking measures to suppress NTSC co-channel interference with symbol decoding results obtained by taking measures to suppress NTSC co-channel interference.

At various points in the circuits shown in the FIGURES of the drawing, shimming delays have to be inserted in order that the sequence of operation is correct, as will be understood by those skilled in electronic design. Unless there is something out of the ordinary about a particular shimming delay requirement, it will not be explicitly referred to in the specification that follows.

FIG. 1 shows a digital television signal receiver used for recovering error-corrected data, which data are suitable for recording by a digital video cassette recorder or for MPEG-2 decoding and display in a television set. The FIG. 1 DTV signal receiver is shown as receiving television broadcast signals from a receiving antenna 8, but can receive the signals from a cable network instead. The television broadcast signals are supplied as input signal to "front end" electronics 10. The "front end" electronics 10 generally include a radio-frequency amplifier and first detector for converting radio-frequency television signals to intermediate-frequency television signals, supplied as input signal to an intermediate-frequency (IF) amplifier chain 12 for vestigial-sideband DTV signals. The DTV receiver is preferably of plural-conversion type with the IF amplifier chain 12 including an IF amplifier for amplifying DTV signals as converted to an ultra-high-frequency band by the first detector, a second detector for converting the amplified DTV signals to a very-high-frequency band, and a further IF amplifier for amplifying DTV signals as converted to the VHF band. If demodulation to baseband is performed in the digital regime, the IF amplifier chain 12 will further include a third detector for converting the amplified DTV signals to a final intermediate-frequency band closer to baseband.

Preferably, a surface-acoustic-wave (SAW) filter is used in the IF amplifier for the UHF band, to shape channel selection response and reject adjacent channels. This SAW filter cuts off rapidly just beyond 5.38 MHz remove from the suppressed carrier frequency of the VSB DTV signal and the pilot carrier, which is of like frequency and of fixed amplitude. This SAW filter accordingly rejects much of the frequency-modulated sound carrier of any co-channel interfering analog TV signal. Removing the FM sound carrier of any co-channel interfering analog TV signal in the IF amplifier chain 12 prevents artifacts of that carrier being generated when the final I-F signal is detected to recover baseband symbols and forestalls such artifacts interfering with data-slicing of those baseband symbols during symbol decoding. The prevention of such artifacts interfering with data-slicing of those baseband symbols during symbol decoding is better than can be accomplished by relying on comb-filtering before data-slicing.

The final IF output signals from the IF amplifier chain 12 are supplied to a complex demodulator 14, which demodulates the vestigial-sideband amplitude-modulation DTV signal in the final intermediate-frequency band to recover a real baseband signal and an imaginary baseband signal. Demodulation may be done in the digital regime after analog-to-digital conversion of a final intermediate-frequency band in the few megacycle range as described for example by C. B. Patel et alii in U.S. Pat. No. 5,479,449 issued Dec. 26, 1995 and entitled "DIGITAL VSB DETECTOR WITH PHASE TRACKER, AS FOR INCLUSION IN AN HDTV RECEIVER". Alternatively, demodulation may be done in the analog regime, in which case the results are usually subjected to analog-to-digital conversion to facilitate further processing. The complex demodulation is preferably done by in-phase (I) synchronous demodulation and quadrature-phase (Q) synchronous demodulation. The digital results of the foregoing demodulation procedures conventionally have 8-bit accuracy or more and describe 2N-level symbols that encode N bits of data. Currently, 2N is eight in the case where the FIG. 1 DTV signal receiver receives a through-the-air broadcast via the antenna 12 and is sixteen in the case where the FIG. 1 DTV signal receiver receives cablecast. The concern of the invention is with the reception of terrestrial through-the-air broadcasts, and FIG. 1 does not show the portions of the DTV receiver providing symbol decoding and error-correction decoding for received cablecast transmissions.

Symbol synchronizer and equalizer circuitry 16 receives at least the digitized real samples of the in-phase (I-channel) baseband signal from the complex demodulator 14; in the FIG. 1 DTV receiver the circuitry 16 is shown also receiving the digitized imaginary samples of the quadrature-phase (Q-channel) baseband signal. The circuitry 16 includes a digital filter with adjustable weighting coefficients that compensates for ghosts and tilt in the received signal. The symbol synchronizer and equalizer circuitry 16 provides symbol synchronization or "de-rotation" as well as amplitude equalization and ghost removal. Symbol synchronizer and equalizer circuitry in which symbol synchronization is accomplished before amplitude equalization is known from U.S. Pat. No. 5,479,449. In such designs the demodulator 14 will supply oversampled demodulator response containing real and imaginary baseband signals to the symbol synchronizer and equalizer circuitry 16. After symbol synchronization, the oversampled data are decimated to extract baseband I-channel signal at normal symbol rate, to reduce sample rate through the digital filtering used for amplitude equalization and ghost removal. Symbol synchronizer and equalizer circuitry in which amplitude equalization precedes symbol synchronization, "de-rotation" or "phase tracking" is also known to those skilled in the art of digital signal receiver design.

Each sample of the circuitry 16 output signal is resolved to ten or more bits and is, in effect, a digital description of an analog symbol exhibiting one of (2N=8) levels. The circuitry 16 output signal is carefully gain-controlled by any one of several known methods, so the ideal step levels for symbols are known. One method of gain control, preferred because the speed of response of such gain control is exceptionally rapid, regulates the direct component of the real baseband signal supplied from the complex demodulator 14 to a normalized level of +1.25. This method of gain control is generally described in U.S. Pat. No. 5,479,449 and is more specifically described by C. B. Patel et alii in U.S. Pat. No. 5,636,252 issued Jun. 3, 1997, entitled "AUTOMATIC GAIN CONTROL OF RADIO RECEIVER FOR RECEIVING DIGITAL HIGH-DEFINITION TELEVISION SIGNALS", and incorporated herein by reference.

The output signal from the circuitry 16 is supplied as input signal to data sync detection circuitry 18, which recovers data field synchronization information F and data segment synchronization information S from the equalized baseband I-channel signal. Alternatively, the input signal to data sync detection circuitry 18 can be obtained prior to equalization.

The equalized I-channel signal samples at normal symbol rate supplied as output signal from the circuitry 16 are applied as the input signal to an NTSC-rejection comb filter 20. The comb filter 20 includes a first delay device 201 to generate a pair of differentially delayed streams of the 2N-level symbols and a first linear combiner 202 for linearly combining the differentially delayed symbol streams to generate the comb filter 20 response. As described in U.S. Pat. No. 5,260,793, the first delay device 201 can provide a delay equal to the period of twelve 2N-level symbols, and the first linear combiner 202 can be a subtractor. Each sample of the comb filter 20 output signal is resolved to ten or more bits and is, in effect, a digital description of an analog symbol exhibiting one of (4N−1)=15 levels.

The symbol synchronizer and equalizer circuitry 16 is presumed be designed to suppress the direct bias component of its input signal (as expressed in digital samples), which direct bias component has a normalized level of +1.25 and appears in the real baseband signal supplied from the complex demodulator 14 owing to detection of the pilot carrier. Accordingly, each sample of the circuitry 16 output signal applied as comb filter 20 input signal is, in effect, a digital description of an analog symbol exhibiting one of the following normalized levels: −7, −5, −3, −1, +1, +3, +5 and +7. These symbol levels are denominated as "odd" symbol levels and are detected by an odd-level data-slicer 22 to generate interim symbol decoding results of 000, 001, 010, 011, 100, 101, 110 and 111, respectively.

Each sample of the comb filter 20 output signal is, in effect, a digital description of an analog symbol exhibiting one of the following normalized levels: −14, −12, −10, −8, −6, −4, −2, 0,+2,+4, +6, +8, +10, +12 and +14. These symbol levels are denominated as "even" symbol levels and are detected by an even-level data-slicer 24 to generate precoded symbol decoding results of 001, 010, 011, 100, 101, 110, 111, 000, 001, 010, 011, 100, 101, 110, and 111, respectively.

The data-slicers 22 and 24 can be of the so-called "hard decision" type, as presumed up to this point in the description, or can be of the so-called "soft decision" type used in implementing a Viterbi decoding scheme. Arrangements are possible in which the odd-level data-slicer 22 and the even-level data-slicer 24 are replaced by a single data-slicer, using multiplexer connections to shift its place in circuit and to provide bias to modify its slicing ranges, but these arrangements are not preferred because of the complexity of operation.

The symbol synchronizer and equalizer circuitry 16 is presumed in the foregoing description to be designed to suppress the direct bias component of its input signal (as expressed in digital samples), which direct bias component has a normalized level of +1.25 and appears in the real baseband signal supplied from the complex demodulator 14 owing to detection of the pilot carrier. Alternatively, the symbol synchronizer and equalizer circuitry 16 is designed to preserve the direct bias component of its input signal, which simplifies the design of the equalization filter in the circuitry 16 somewhat. In such case the data-slicing levels in the odd-level data-slicer 22 are offset to take into account the direct bias component accompanying the data steps in its input signal. Providing that the first linear combiner 202 is a subtractor, whether the circuitry 16 is designed to suppress or to preserve the direct bias component of its input signal has no consequence in regard to the data-slicing levels in the even-level data-slicer 24. However, if the differential delay provided by the first delay device 201 is chosen so that the first linear combiner 202 is an adder, the data-slicing levels in the even-level data-slicer 24 should be offset to take into account the doubled direct bias component accompanying the data steps in its input signal.

A comb filter 26 is used after the data-slicers 22 and 24 to generate a postcoding filter response to the precoding filter response of the comb filter 20. The comb filter 26 includes a 3-input multiplexer 261, a second linear combiner 262, and a second delay device 263 with delay equal to that of the first delay device 201 in the comb filter 20. The second linear combiner 262 is a modulo-8 adder if the first linear combiner 202 is a subtractor and is a modulo-8 subtractor if the first linear combiner 202 is an adder. The first linear combiner 202 and the second linear combiner 262 may be constructed as respective read-only memories (ROMs) to speed up linear combination operations sufficiently to support the sample rates involved. The output signal from the multiplexer 261 furnishes the response from the postcoding comb filter 26 and is delayed by the second delay device 263. The second linear combiner 262 combines precoded symbol decoding results from the even-level data-slicer 24 with the output signal from the second delay device 263.

The output signal of the multiplexer 261 reproduces one of the three input signals applied to the multiplexer 261, as selected in response to first, second and third states of a multiplexer control signal supplied to the multiplexer 261 from a controller 28. The first input port of the multiplexer 261 receives ideal symbol decoding results supplied from memory within the controller 28 during times when data field synchronization information F and data segment synchronization information S from the equalized baseband I-channel signal are recovered by the data sync detection circuitry 18. The controller 28 supplies the first state of the multiplexer control signal to the multiplexer 261 during these times, conditioning the multiplexer 261 to furnish, as the final coding results which are its output signal, the ideal symbol decoding results supplied from memory within the controller 28. The odd-level data-slicer 22 supplies interim symbol decoding results as its output signal to the second input port of the multiplexer 261. The multiplexer 261 is conditioned by the second state of the multiplexer control signal to reproduce the interim symbol decoding results, as the final coding results which are its output signal. The second linear combiner 262 supplies postcoded symbol decoding results as its output signal to the third input port of the multiplexer 261. The multiplexer 261 is conditioned by the third state of the multiplexer control signal to reproduce the postcoded symbol decoding results, as the final coding results which are its output signal.

Running errors in the postcoded symbol decoding results from the postcoding comb filter 26 are curtailed by feeding back the ideal symbol decoding results supplied from memory within the controller 28 during times data sync detection circuitry 18 recovers data field synchronization information F and data segment synchronization information S. This is an important aspect of the invention, which will be described in greater detail further on in this specification.

The output signal from the multiplexer 261 in the postcoding comb filter 26 comprises the final symbol decoding results in 3-parallel-bit groups, assembled by a data assembler 30 for application to a data interleaver 32. The data interleaver 32 commutates the assembled data into parallel data streams for application to trellis decoder circuitry 34. Trellis decoder circuitry 34 conventionally uses twelve trellis decoders. The trellis decoding results are supplied from the trellis decoder circuitry 34 to data de-interleaver circuitry 36 for de-commutation. Byte parsing circuitry 38 converts the data interleaver 36 output signal into bytes of Reed-Solomon error-correction coding for application to Reed-Solomon decoder circuitry 40, which performs Reed-Solomon decoding to generate an error-corrected byte stream supplied to a data de-randomizer 42. The data de-randomizer 42 supplies reproduced data to the remainder of the receiver (not shown). The remainder of a complete DTV receiver will include a packet sorter, an audio decoder, an MPEG-2 decoder and so forth. The remainder of a DTV receiver incorporated in a digital tape recorder/reproducer will include circuitry for converting the data to a form for recording.

An NTSC co-channel interference detector 44 supplies the controller 28 with an indication of whether NTSC co-channel interference is of sufficient strength as to cause uncorrectable error in the data-slicing performed by the data-slicer 22. If detector 44 indicates the NTSC co-channel interference is not of such strength, the controller 28 will supply the second state of multiplexer control signal to the multiplexer 261 at times other than those times when data field synchronization information F and data segment synchronization information S are recovered by the data sync detection circuitry 18. This conditions the multiplexer 261 to reproduce as its output signal the interim symbol decoding results supplied from the odd-level data-slicer 22. If detector 44 indicates the NTSC co-channel interference is of sufficient strength to cause uncorrectable error in the data-slicing performed by the data-slicer 22, the controller 28 will supply the third state of multiplexer control signal to the multiplexer 261 at times other than those times when data field synchronization information F and data segment synchronization information S are recovered by the data sync detection circuitry 18. This conditions the multiplexer 261 to reproduce as its output signal the postcoded symbol decoding results provided as second linear combining results from the second linear combiner 262.

Figure 2:
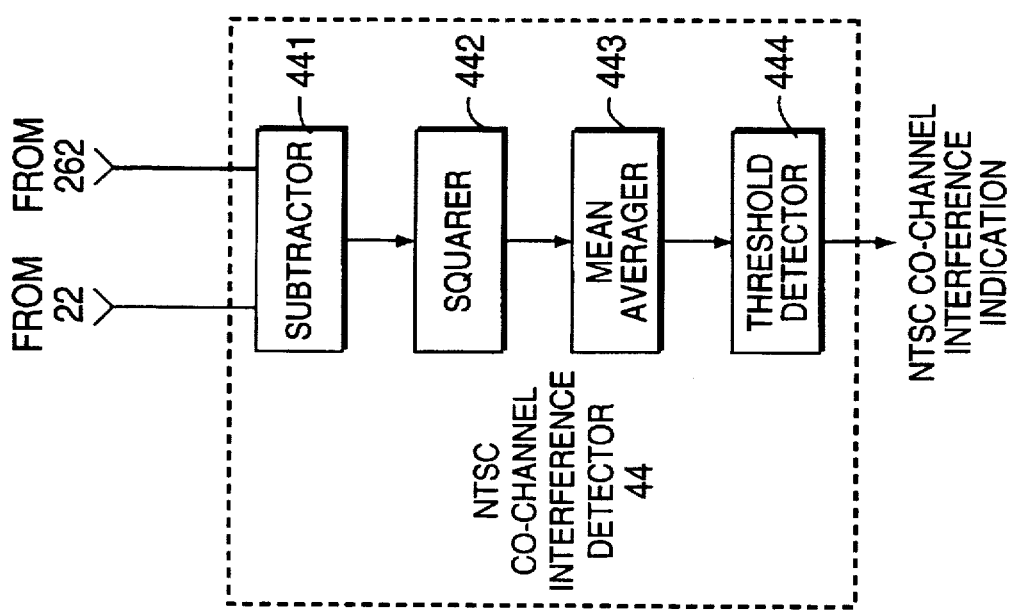
FIG. 2 is a block schematic diagram showing details of an NTSC co-channel interference detector for use in the FIG. 1 digital television signal receiver, which NTSC co-channel interference detector in accordance with an aspect of the invention provides one type of best-estimate-selection circuitry for selecting best estimates from various symbol decoding results, to generate final symbol decoding results at times between those times when synchronization codes occur.

FIG. 2 shows a form the NTSC co-channel interference detector 44 can take in one embodiment of the invention. A subtractor 441 differentially combines the interim symbol decoding results supplied from the odd-level data-slicer 22 and the postcoded symbol decoding results provided as second linear combining results from the second linear combiner 262. If the amount of NTSC co-channel interference is negligible, and if the random noise in the baseband I-channel signal is negligible, these interim and postcoded symbol decoding results should be similar, so the difference output signal from the subtractor 441 should be low. If the amount of NTSC co-channel interference is appreciable, however, the difference output signal from the subtractor 441 will not be generally low, but rather will often be high.

A measure of the energy in the difference output signal from the subtractor 441 is developed by squaring the difference output signal with a squarer 442 and determining the mean average of the squarer response over a prescribed short time interval with a mean averaging circuit 443. The squarer 442 can be implemented using read-only memory (ROM). The mean averaging circuit 443 can be implemented using a delay line memory for storing several successive digital samples and an adder for summing the digital samples currently stored in the delay line memory. The short-term mean average of the energy in the difference output signal from the subtractor 441, as determined by the mean averaging circuit 443, is supplied to a digital comparator connected to provide a threshold detector 444. The threshold in the threshold detector 444 is sufficiently high not to be exceeded the short-term mean-average of differences in the random noise accompanying the interim symbol decoding results and the postcoded symbol decoding results applied to the subtractor 441. The threshold is exceeded if the NTSC co-channel interference is of sufficient strength as to cause uncorrectable error in the data-slicing performed by the data-slicer 22. The threshold detector 444 supplies the controller 28 indication of whether or not the threshold is exceeded.

In alternative embodiment of the squarer 442 can be replaced by other circuitry for developing absolute measures of the departures between said first and second estimated symbol decoding results, such as an absolute-value circuit, for example. To speed calculation, such absolute-value circuit can be realized using read-only memory.

Figure 3:
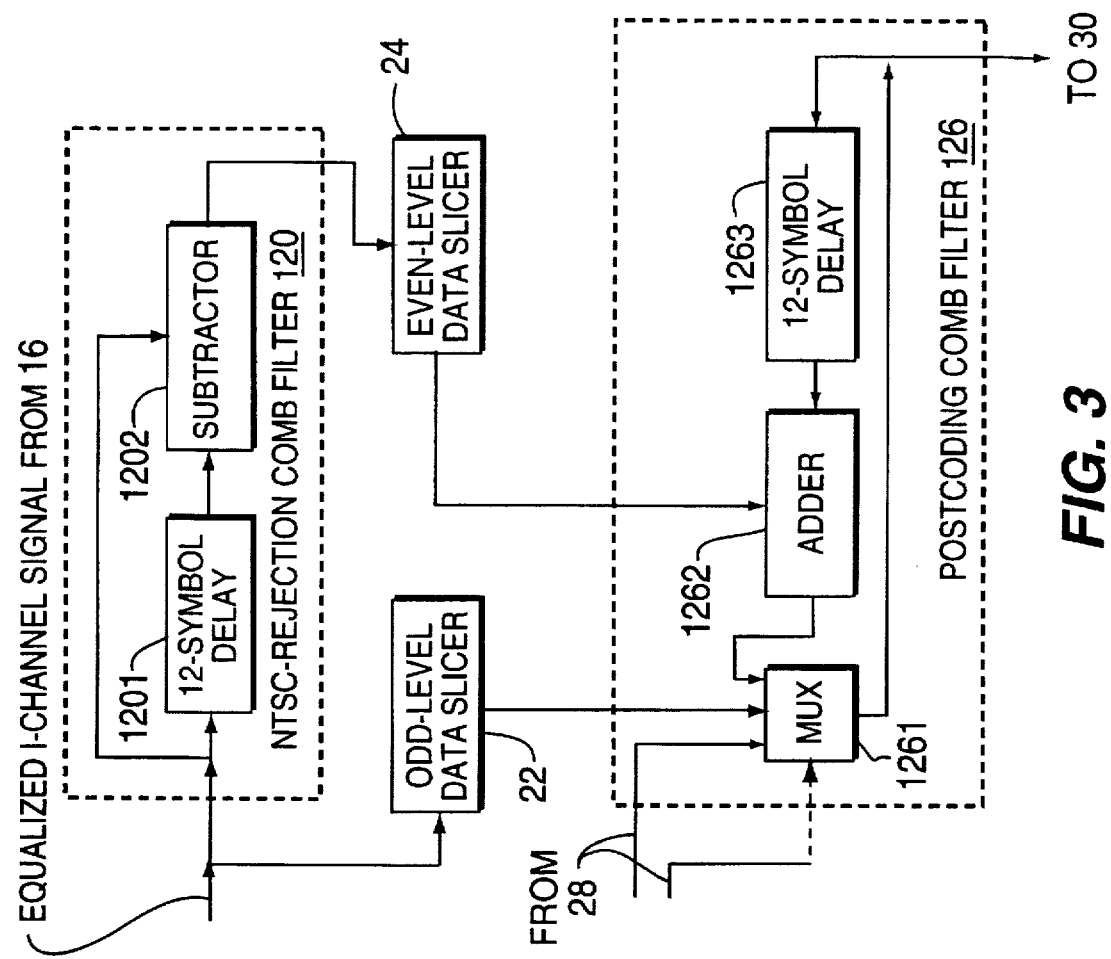
FIG. 3 is a block schematic diagram showing details of a portion of the FIG. 1 digital television signal receiver when the NTSC-rejection comb filter employs a 12-symbol delay.

FIG. 3 is a block schematic diagram showing details of a portion of the FIG. 1 digital television signal receiver using a species 120 of the NTSC-rejection comb filter 20 and a species 126 of the postcoding comb filter 26. A subtractor 1202 serves as the first linear combiner in the NTSC-rejection comb filter 120, and a modulo-8 adder 1262 serves as the second linear combiner in the postcoding comb filter 126. The NTSC-rejection comb filter 120 uses a first delay device 1201 exhibiting a delay of twelve symbol epochs, and the postcoding comb filter 126 uses a second delay device 1263 also exhibiting a delay of twelve symbol epochs. The 12-symbol delay exhibited by each of the delay devices 1201 and 1263 is close to one cycle delay of the artifact of the analog TV video carrier at 59.75 times the analog TV horizontal scan frequency $f_H$. The 12-symbol delay is close to five cycles of the artifact of the analog TV chrominance subcarrier at 287.25 times $f_H$. The 12-symbol delay is close to six cycles of the artifact of the analog TV sound carrier at 345.75 times $f_H$. This is the reason that the differentially combined response of the subtractor 1202 to the audio carrier, to the video carrier and to frequencies close to chrominance subcarrier differentially delayed by the first delay device 1201 tends to have reduced co-channel interference. However, in portions of a video signal in which edges cross a horizontal scan line, the amount of correlation in the analog TV video signal at such distances in the horizontal spatial direction is quite low.

A species 1261 of the multiplexer 261 is controlled by a multiplexer control signal that is in its second state most of the time when it is determined there is insufficient NTSC co-channel interference to cause uncorrectable error in the output signal from the data-slicer 22 and that is in its third state most of the time when it is determined there is sufficient NTSC co-channel interference to cause uncorrectable error in the output signal from the data-slicer 22. The multiplexer 1261 is conditioned by its control signal being in its third state to feed back the modulo-8 sum results of the adder 1262, as delayed twelve symbol epochs by the delay device 1263, to the adder 1262 as a summand. This is a modular accumulation procedure in which a single error propagates as a running error, with error recurring every twelve symbol epochs. Running errors in the postcoded symbol decoding results from the postcoding comb filter 126 are curtailed by the multiplexer 1261 being placed into its first state for four symbol epochs at the beginning of each data segment, as well as during the entirety of each data segment containing field sync. When this control signal is in its first state, the multiplexer 1261 reproduces as its output signal ideal symbol decoding results supplied from memory in the controller 28. The introduction of ideal symbol decoding results into the multiplexer 1261 output signal halts a running error. Since there are 4+69(12) symbols per data segment, the ideal symbol decoding results slip back four symbol epochs in phase each data segment, so no running error can persist for longer than three data segments.

Figure 4:
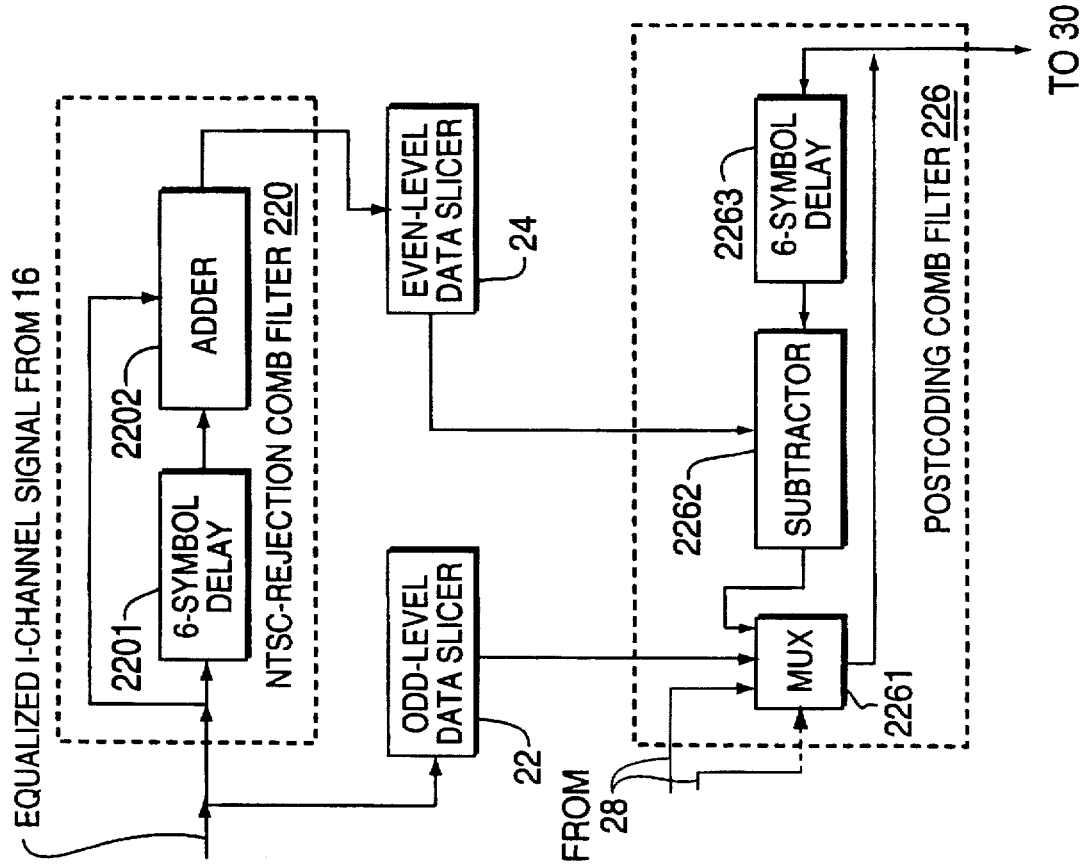
FIG. 4 is a block schematic diagram showing details of a portion of the FIG. 1 digital television signal receiver when the NTSC-rejection comb filter employs a 6-symbol delay.

FIG. 4 is a block schematic diagram showing details of a portion of the FIG. 1 digital television signal receiver using a species 220 of the NTSC-rejection comb filter 20 and a species 226 of the postcoding comb filter 26. The NTSC-rejection comb filter 220 uses a first delay device 2201 exhibiting a delay of six symbol epochs, and the postcoding comb filter 226 uses a second delay device 2263 also exhibiting a delay of six symbol epochs. The 6-symbol delay exhibited by each of the delay devices 2201 and 2263 is close to 0.5 cycle delay of the artifact of the analog TV video carrier at 59.75 times the analog TV horizontal scan frequency $f_H$, close to 2.5 cycles of the artifact of the analog TV chrominance subcarrier at 287.25 times $f_H$, and close to 3 cycles of any artifact of the analog TV audio carrier at 345.75 times $f_H$. An adder 2202 serves as the first linear combiner in the NTSC-rejection comb filter 220, and a modulo-8 subtractor 2262 serves as the second linear combiner in the postcoding comb filter 226. Since the delay exhibited by the delay devices 2201 and 2263 is shorter than the delay exhibited by the delay devices 1201 and 1263, although nulls near frequencies converted from analog TV carrier frequencies are narrower band, there is more likely to be good anti-correlation in the signals additively combined by the adder 2202 than there is likely to be good correlation in the signals differentially combined by the subtractor 1202. The suppression of the sound carrier is poorer in the NTSC-rejection comb filter 220 response than in the NTSC-rejection comb filter 120 response. However, if the sound carrier of a co-channel interfering analog TV signal has been suppressed by SAW filtering or a sound trap in the IF amplifier chain 12, the poor sound rejection of the comb filter 220 is not a problem. The responses to sync tips is reduced in duration using the NTSC-rejection comb filter 220 of FIG. 4 rather than the NTSC-rejection comb filter 120 of FIG. 3, so there is substantially reduced tendency to overwhelm error-correction in the trellis decoding and Reed-Solomon coding.

A species 2261 of the multiplexer 261 is controlled by a multiplexer control signal that is in its second state most of the time when it is determined there is insufficient NTSC co-channel interference to cause uncorrectable error in the output signal from the data-slicer 22 and that is in its third state most of the time when it is determined there is sufficient NTSC co-channel interference to cause uncorrectable error in the output signal from the data-slicer 22. The multiplexer 2261 is conditioned by its control signal being in its third state to feed back the modulo-8 sum results of the adder 2262, as delayed six symbol epochs by the delay device 2263, to the adder 2262 as a summand. This is a modular accumulation procedure in which a single error propagates as a running error, with error recurring every six symbol epochs. Running errors in the postcoded symbol decoding results from the postcoding comb filter 226 are curtailed by the multiplexer 2261 being placed into its first state for four symbol epochs at the beginning of each data segment, as well as during the entirety of each data segment containing field sync. When this control signal is in its first state, the multiplexer 2261 reproduces as its output signal ideal symbol decoding results supplied from memory in the controller 28. The introduction of ideal symbol decoding results into the multiplexer 2261 output signal halts a running error. Since there are 4+138(6) symbols per data segment, the ideal symbol decoding results slip back four symbol epochs in phase each data segment, so no running error can persist for longer than two data segments. The likelihood of a protracted period of running error in the postcoding comb filter 226 is substantially less than in the postcoding comb filter 126, although the running error recurs more frequently and affects twice as many of the twelve interleaved trellis codes.

Figure 5:
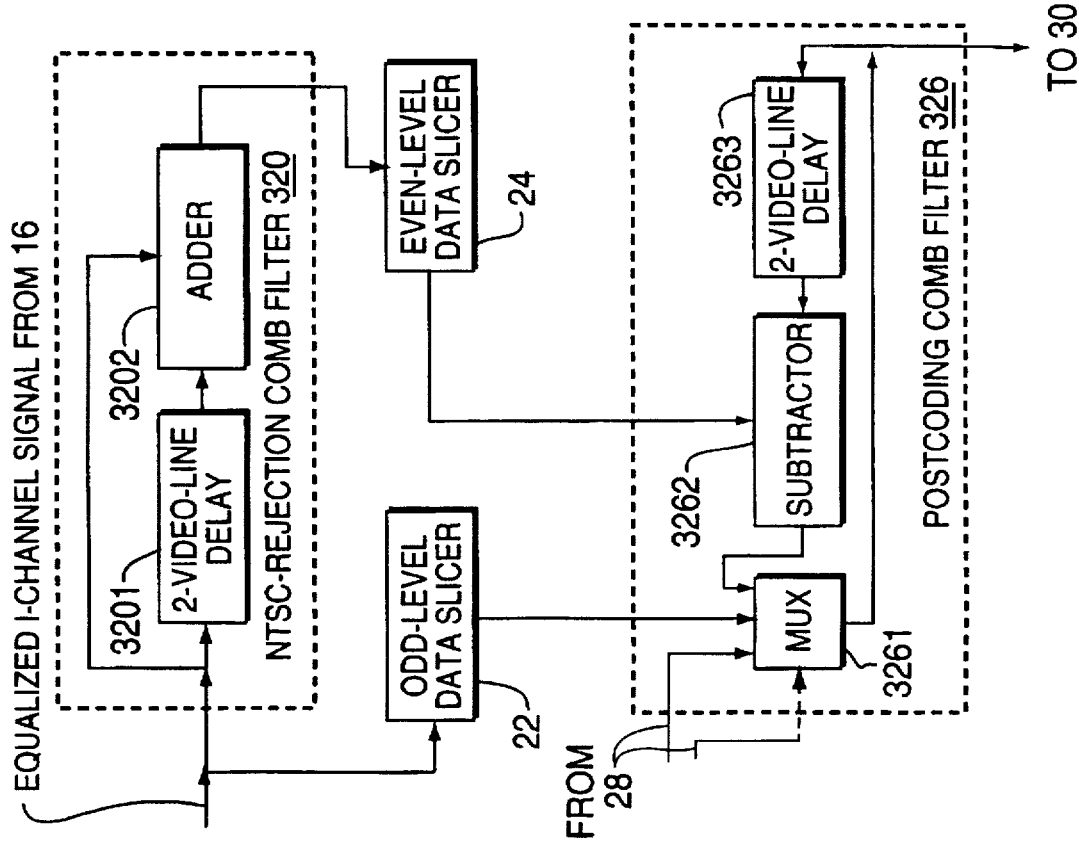
FIG. 5 is a block schematic diagram showing details of a portion of the FIG. 1 digital television signal receiver when the NTSC-rejection comb filter employs a 2-video-line delay.

FIG. 5 is a block schematic diagram showing details of a portion of the FIG. 1 digital television signal receiver using a species 320 of the NTSC-rejection comb filter 20 and a species 326 of the postcoding comb filter 26. The NTSC-rejection comb filter 320 uses a first delay device 3201 exhibiting a delay of 1368 symbol epochs, which delay is substantially equal to the epoch of two horizontal scan lines of an analog TV signal, and the postcoding comb filter 326 uses a second delay device 3263 also exhibiting such delay. The first linear combiner in the NTSC-rejection comb filter 320 is an adder 3202, and the second linear combiner in the postcoding comb filter 326 is a modulo-8 subtractor 3262.

A species 3261 of the multiplexer 261 is controlled by a multiplexer control signal that is in its second state most of the time when it is determined there is insufficient NTSC co-channel interference to cause uncorrectable error in the output signal from the data-slicer 22 and that is in its third state most of the time when it is determined there is sufficient NTSC co-channel interference to cause uncorrectable error in the output signal from the data-slicer 22. The DTV receiver preferably contains circuitry for detecting change between alternate scan lines in the NTSC co-channel interference, so that the controller 28 can withhold supplying the third state of the multiplexer 3261 control signal under such conditions.

The multiplexer 3261 is conditioned by its control signal being in its third state to feed back the modulo-8 sum results of the adder 3262, as delayed 1368 symbol epochs by the delay device 3263, to the adder 3262 as a summand. This is a modular accumulation procedure in which a single error propagates as a running error, with error recurring every 1368 symbol epochs. This symbol code span is longer than the span for a single block of the Reed-Solomon code, so a single running error is readily corrected during Reed-Solomon decoding. Running errors in the postcoded symbol decoding results from the postcoding comb filter 326 are curtailed by the multiplexer 3261 being placed into its first state during the entirety of each data segment containing field sync, as well as for four symbol epochs at the beginning of each data segment. When this control signal is in its first state, the multiplexer 3261 reproduces as its output signal ideal symbol decoding results supplied from memory in the controller 28. The introduction of ideal symbol decoding results into the multiplexer 3261 output signal halts a running error. The 16.67 millisecond duration of an NTSC video field exhibits phase slippage against the 24.19 millisecond duration of a DTV data field, so the DTV data segments containing field sync eventually scan the entire NTSC frame raster. The 525 lines in the NTSC frame raster each contain 684 symbol epochs, for a total of 359,100 symbol epochs. Since this is somewhat less than 432 times the 832 symbol epochs in a DTV data segment containing field sync, one can guess with reasonable confidence that running errors of duration longer than 432 data fields will be expunged by the multiplexer 3261 reproducing ideal symbol decoding results during DTV data segments containing field sync. There is also phase slippage between data segments, for the start code groups of which ideal symbol decoding results are available, and NTSC video scan lines. One can estimate 359,100 symbol epochs, which is 89,775 times the four symbol epochs in a code start group, are scanned during 89,775 consecutive data segments. Since there are 313 data segments per DTV data field, one can guess with reasonable confidence that running errors of duration longer than 287 data fields will be expunged by the multiplexer 3261 reproducing ideal symbol decoding results during the code start groups. The two sources of suppression of running errors are reasonably independent of each other, so running errors of duration longer than two hundred or so data fields are quite unlikely. Furthermore, if NTSC co-channel interference dips low at a time when the running error recurs, to condition the multiplexer 3261 for reproducing the response of the data-slicer 22 as its output signal, the error may be corrected earlier than would otherwise be the case.

The FIG. 5 NTSC-rejection comb filter 320 is quite good in suppressing demodulation artifacts generated in response to analog TV horizontal synchronizing pulses, as well as suppressing many of the demodulation artifacts generated in response to analog TV vertical synchronizing pulses and equalizing pulses. These artifacts are the co-channel interference with highest energy. Except where there is scan-line-to-scan-line change in the video content of the analog TV signal over the period of two scan lines, the NTSC-rejection comb filter 320 provides reasonably good suppression of that video content regardless of its color. The suppression of the FM audio carrier of the analog TV signal is reasonably good, in case it has not been suppressed by a tracking rejection filter in the symbol synchronization and equalization circuitry 16. Artifacts of most analog TV color bursts are suppressed in the NTSC-rejection comb filter 320 response, too. Furthermore, the filtering provided by the NTSC-rejection comb filter 320 is "orthogonal" to the NTSC-interference rejection built into the trellis decoding procedures.

FIG. 6 is a block schematic diagram showing details of a portion of the FIG. 1 digital television signal receiver using a species 420 of the NTSC-rejection comb filter 20 and a species 426 of the postcoding comb filter 26. The NTSC-rejection comb filter 420 uses a first delay device 4201 exhibiting a delay of 179,208 symbol epochs, which delay is substantially equal to the period of 262 horizontal scanning lines of an analog TV signal, and the postcoding comb filter 426 uses a second delay device 4261 also exhibiting such delay. An adder 4202 serves as the first linear combiner in the NTSC-rejection comb filter 420, and a modulo-8 subtractor 4262 serves as the second linear combiner in the postcoding comb filter 426.

A species 4261 of the multiplexer 261 is controlled by a multiplexer control signal that is in its second state most of the time when it is determined there is insufficient NTSC co-channel interference to cause uncorrectable error in the output signal from the data-slicer 22 and that is in its third state most of the time when it is determined there is sufficient NTSC co-channel interference to cause uncorrectable error in the output signal from the data-slicer 22. The DTV receiver preferably contains circuitry for detecting field-to-field change in the NTSC co-channel interference, so that the controller 28 can withhold supplying the third state of the multiplexer 4261 control signal under such conditions.

The multiplexer 4261 is conditioned by its control signal being in its third state to feed back the modulo-8 sum results of the adder 4262, as delayed 179,208 symbol epochs by the delay device 4263, to the adder 4262 as a summand. This is a modular accumulation procedure in which a single error propagates as a running error, with error recurring every 179,208 symbol epochs. This symbol code span is longer than the span for a single block of the Reed-Solomon code, so a single running error is readily corrected during Reed-Solomon decoding. Running errors in the postcoded symbol decoding results from the postcoding comb filter 426 are curtailed by the multiplexer 4261 being placed into its first state during the entirety of each data segment containing field sync, as well as for four symbol epochs at the beginning of each data segment. When this control signal is in its first state, the multiplexer 4261 reproduces as its output signal ideal symbol decoding results supplied from memory in the controller 28. The introduction of ideal symbol decoding results into the multiplexer 4261 output signal halts a running error. The maximum number of data fields required to expunge running error in the multiplexer 4261 output signal is presumably substantially the same as required to expunge running error in the multiplexer 3261 output signal. However, the number of times the error recurs in that period is lower by a factor of 131.

The FIG. 6 NTSC-rejection comb filter 420 suppresses most demodulation artifacts generated in response to analog TV vertical synchronizing pulses and equalizing pulses, as well as suppressing all the demodulation artifacts generated in response to analog TV horizontal synchronizing pulses. These artifacts are the co-channel interference with highest energy. Also, the NTSC-rejection comb filter 420 suppresses artifacts arising from the video content of the analog TV signal that does not change from field to field or line-to-line, getting rid of stationary patterns irrespective of their horizontal spatial frequency or color. Artifacts of most analog TV color bursts are suppressed in the NTSC-rejection comb filter 420 response, too FIG. 7 is a block schematic diagram showing details of a portion of the FIG. 1 digital television signal receiver using a species 520 of the NTSC-rejection comb filter 20 and a species 526 of the postcoding comb filter 26. The NTSC-rejection comb filter 520 uses a first delay device 5201 exhibiting a delay of 718,200 symbol epochs, which delay is substantially equal to the period of two frames of an analog TV signal, and the postcoding comb filter 526 uses a second delay device 5261 also exhibiting such delay. A subtractor 5202 serves as the first linear combiner in the NTSC-rejection comb filter 520, and a modulo-8 adder 5262 serves as the second linear combiner in the postcoding comb filter 526.

A species 5261 of the multiplexer 261 is controlled by a multiplexer control signal that is in its second state most of the time when it is determined there is insufficient NTSC co-channel interference to cause uncorrectable error in the output signal from the data-slicer 22 and that is in its third state most of the time when it is determined there is sufficient NTSC co-channel interference to cause uncorrectable error in the output signal from the data-slicer 22. The DTV receiver preferably contains circuitry for detecting change between alternate frames in the NTSC co-channel interference, so that the controller 28 can withhold supplying the third state of the multiplexer 5261 control signal under such conditions.

The multiplexer 5261 is conditioned by its control signal being in its third state to feed back the modulo-8 sum results of the adder 5262, as delayed 718,200 symbol epochs by the delay device 5263, to the adder 5262 as a sunmmand. This is a modular accumulation procedure in which a single error propagates as a running error, with error recurring every 718,200 symbol epochs. This symbol code span is longer than the span for a single block of the Reed-Solomon code, so a single running error is readily corrected during Reed-Solomon decoding. Running errors in the postcoded symbol decoding results from the postcoding comb filter 526 are curtailed by the multiplexer 5261 being placed into its first state during the entirety of each data segment containing field sync, as well as for four symbol epochs at the beginning of each data segment. When this control signal is in its first state, the multiplexer 5261 reproduces as its output signal ideal symbol decoding results supplied from memory in the controller 28. The introduction of ideal symbol decoding results into the multiplexer 5261 output signal halts a running error. The maximum number of data fields required to expunge running error in the multiplexer 5261 output signal is presumably substantially the same as required to expunge running error in the multiplexer 3261 output signal. However, the number of times the error recurs in that period is lower by a factor of 525.

The FIG. 7 NTSC-rejection comb filter 520 suppresses all demodulation artifacts generated in response to analog TV vertical synchronizing pulses and equalizing pulses, as well as suppressing all the demodulation artifacts generated in response to analog TV horizontal synchronizing pulses. These artifacts are the co-channel interference with highest energy. Also, the NTSC-rejection comb filter 520 suppresses artifacts arising from the video content of the analog TV signal that does not change over two frames, getting rid of such very stationary patterns irrespective of their spatial frequency or color. Artifacts of all analog TV color bursts are suppressed in the NTSC-rejection comb filter 520 response, too.

One skilled in the art of television system design will discern other properties of correlation and anti-correlation in analog TV signals that can be exploited in the design of NTSC-rejection filters of still other types than those shown in FIGS. 3–7. The use of NTSC-rejection filters that cascade two NTSC-rejection filters of the types already disclosed increases the 2N levels of the baseband signals to (8N−1) data levels. Such filters may be required to overcome particularly bad co-channel interference problems despite their shortcoming of reducing signal-to-noise for random noise interference with symbol decoding.

Figure 8:
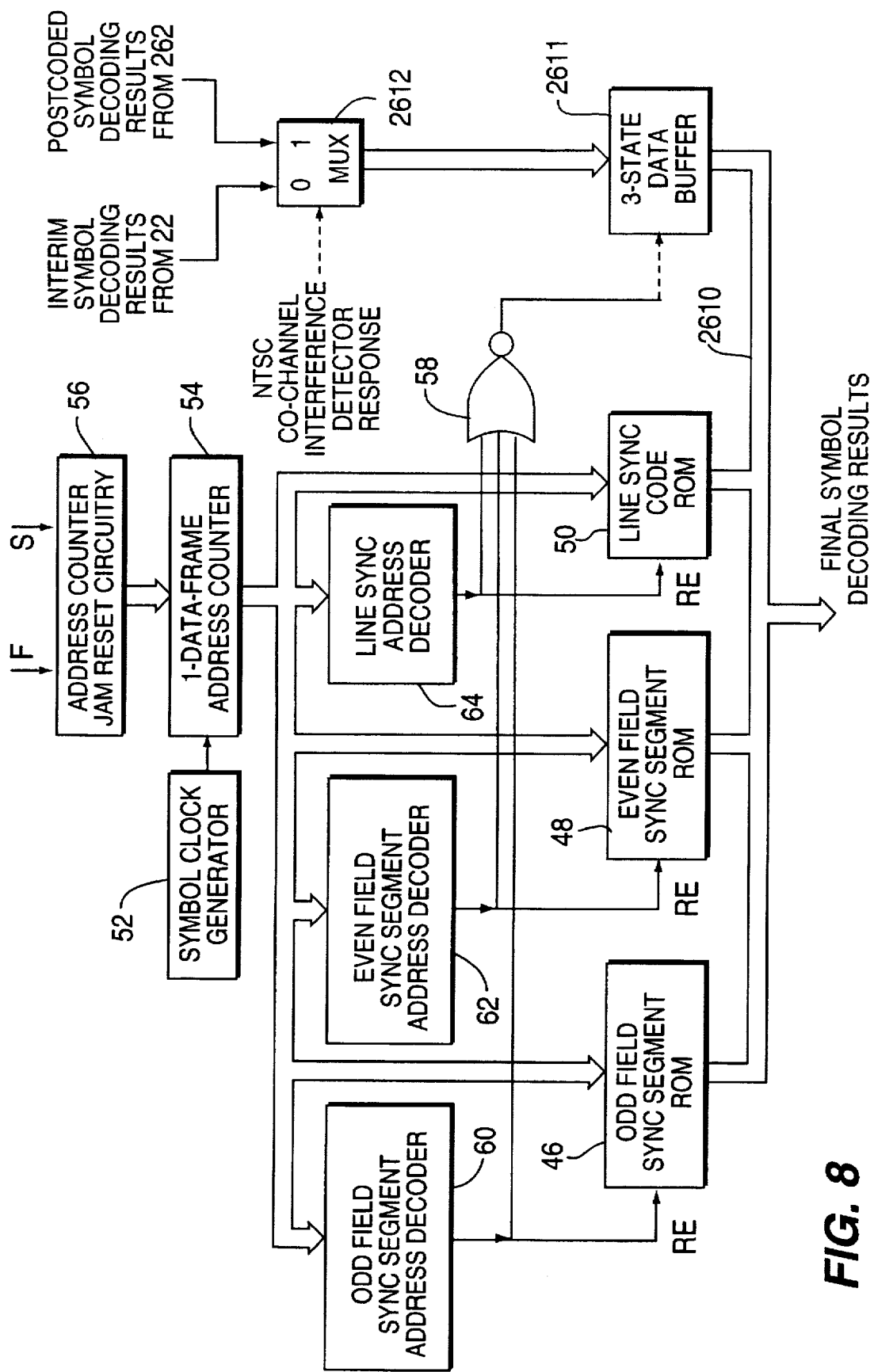
FIG. 8 is a block schematic diagram showing details of a portion of the FIG. 1 digital television signal receiver for generating prescribed symbol decoding results during data synchronization intervals.

FIG. 8 shows a preferred construction of the multiplexer 261 of FIG. 1 in greater detail, together with the circuitry for generating the ideal symbol decoding results applied to the multiplexer 261. The multiplexer 261 comprises the output buffer registers of read-only memories (ROMs) 46, 48, 50 for selectively reading to a 3-bit-wide output bus 2610 from the multiplexer 261. The multiplexer 261 further comprises a tri-state buffer 2611 for selectively forwarding the 3-bit-wide output of a multiplexer 2612 to the output bus 2610 during times when ideal symbol decoding results are not generated. The multiplexer 261 responds to the NTSC co-channel interference detector 44 being a ZERO indicative that NTSC co-channel interference is not of such amplitude as to cause uncorrectable error in the interim symbol decoding results supplied by the data-slicer 22 to reproduce the interim symbol decoding results as input signal to the tri-state data buffer 2611. The multiplexer 261 responds to the NTSC co-channel interference detector 44 being a ONE indicative that NTSC co-channel interference is of such amplitude as to cause uncorrectable error in the interim symbol decoding results supplied by the data-slicer 22 to reproduce the precoded symbol decoding results from the second linear combiner 262 as input signal to the tri-state data buffer 2611.

The circuitry for generating the ideal symbol decoding results applied to the output bus 2610 comprises the ROMs 46, 48, 50; a symbol clock generator 52; an address counter 54 for addressing the ROMs 46, 48, 50; jam reset circuitry 56 for resetting the counter 54; the address decoders 60, 62, 64 for generating read enable signals for the ROMs 46, 48, 50; and a NOR gate 92 for controlling the tri-state buffer 2611. The address counter 54 counts input pulses received at symbol decoding rate from the symbol clock generator 52, thereby to generate successive addresses respectively descriptive of the symbols in one data frame. Suitable portions of these addresses are applied to the ROMs 46, 48, 50 as their input addresses. The jam reset circuitry 56 resets the counter 54 to appropriate counts responsive to data field synchronization information F and data segment synchronization information S recovered by the data sync detection circuitry 18 of FIG. 1.

It is preferable to configure the counter 54 so a group of more significant bits counts the number of data segments per data frame and so a group of less significant bits counts the number of symbols per data segment. This simplifies the design of the jam reset circuitry 56; reduces the bit-widths of input signal to the address decoders 60, 62, 64; and facilitates the ROMs 46, 48, 50 being addressed by partial addresses from the counter 54, reducing the bit widths of ROM addressing.

The ROM 46 stores ideal symbol decoding results for an odd field sync segment and is selectively enabled for reading by receiving a ONE from the address decoder 60. The ROM 46 is addressed by the group of less significant bits of counter 54 output that counts the number of symbols per data segment group; and the address decoder 60 responds to the group of more significant bits that counts the number of data segments per data frame. The address decoder 60 generates a ONE when and only when the data segment portion of the address supplied by the address counter 54 corresponds to the address of an odd field sync segment.

The ROM 48 stores ideal symbol decoding results for an even field sync segment and is selectively enabled for reading by receiving a ONE from the address decoder 62. The ROM 48 is addressed by the group of less significant bits of counter 54 output that counts the number of symbols per data segment group; and the address decoder 62 responds to the group of more significant bits that counts the number of data segments per data frame. The address decoder 62 generates a ONE when and only when the data segment portion of the address supplied by the address counter 54 corresponds to the address of an even field sync segment.

The ROM 50 stores ideal symbol decoding results for the start code group at the beginning of each sync segment and is selectively enabled for reading by receiving a ONE from the address decoder 64. The ROM 50 responds to the two least significant bits of counter 54 output; and the address decoder 64 responds to the group of less significant bits of counter 54 output that counts the number of symbols per data segment group. The address decoder 64 generates a ONE when and only when the data symbol per data segment count portion of the address supplied by the address counter 54 corresponds to the partial address of a start code group.

The NOR gate 92 receives the responses of the address decoders 60, 62 and 64 at respective ones of its three input connections. When ideal symbol decoding results are available, one of the address decoders 60, 62 and 64 supplies a ONE as its output signal, conditioning the NOR gate 92 to supply a ZERO response to the tri-state data buffer 2611. This conditions the tri-state data buffer 2611 to exhibit high source impedances to the bit lines of the data bus 2610, so the signal forwarded from the multiplexer 2611 will not be asserted on the 3-bit-wide data bus 2610 from the multiplexer 2612. During those portions of data segments for which ideal symbol decoding results are not predictable, none of the address decoders 60, 62 and 64 supplies a ONE as its output signal, conditioning the NOR gate 92 to supply a ONE response to the tri-state data buffer 2611. This conditions the tri-state data buffer 2611 to exhibit low source impedances to the bit lines of the data bus 2610, so the signal forwarded from the multiplexer 2612 will be asserted on the 3-bit-wide data bus 2610.

FIG. 9 shows a modification of a digital television signal receiver as thusfar described, constructed in accordance with a further aspect of the invention so as to operate in parallel a plurality of symbol decoders using respective even-level data-slicers, each preceded by a different type of NTSC-rejection comb filter and each succeeded by a respective postcoding comb filter to compensate for the precoding introduced by the preceding NTSC-rejection comb filter. An even-level data-slicer A24 converts the response of an NTSC-rejection filter A20 of a first type to first precoded symbol decoding results for application to a postcoding comb filter A26 of a first type. An even-level data-slicer B24 converts the response of an NTSC-rejection filter B20 of a second type to second precoded symbol decoding results for application to a postcoding comb filter B26 of a second type. An even-level data-slicer C24 converts the response of an NTSC-rejection filter C20 of a third type to third precoded symbol decoding results for application to a postcoding comb filter C26 of a third type. The prefixes A, B and C in the identification numbers for the elements of FIG. 9 are different integers which will correspond to respective ones of the integers 1, 2, 3, 4 and 5 when receiver portions as shown in ones of FIGS. 3 –7 are employed.

Symbol decoding selection circuitry 66 in FIG. 9 formulates a best estimate of correct symbol decoding for application to the trellis decoding circuitry 34, selecting from ideal symbol decoding results, from the interim symbol decoding results received from the data-slicer 22 and from the various postcoded symbol coding results received from postcoding comb filters A26, B26 and C26. The best estimate of symbol decoding results are used to correct the summation procedures in the postcoding comb filters A26, B26 and C26.

The NTSC-rejection comb filter A20 and the postcoding comb filter A26 circuitry are advantageously chosen to be of types like the NTSC-rejection comb filter 520 and the postcoding comb filter 526 circuitry of FIG. 7. This is so despite a considerable cost in memory, since 718,200 symbols have to be stored in each of the 2-video-frame delays 5201 and 5263. However, the storage in the 2-video-frame delay 5201 can be used for realizing the shorter delays 4201, 3201, 2201, 1201. Also, the storage in the 2-video-frame delay can be used for realizing the shorter delays 4263, 3263, 2263, 1263.

The high-energy demodulation artifacts generated in response to analog TV synchronizing pulses, equalizing pulses, and color bursts are all suppressed when the NTSC-rejection comb filter A20 additively combines alternate video frames. Also, artifacts arising from the video content of the analog TV signal that does not change over two frames are suppressed, getting rid of stationary patterns irrespective of their spatial frequency or color.

The remaining problem of suppressing demodulation artifacts primarily concerns suppressing those demodulation artifacts arising from frame-to-frame difference at certain pixel locations within the analog TV signal raster. These demodulation artifacts can be suppressed by intra-frame filtering techniques. The NTSC-rejection comb filter B20 and the postcoding comb filter B26 circuitry can be chosen to suppress remnant demodulation artifacts by relying on correlation in the horizontal direction, and the NTSC-rejection comb filter C20 and the postcoding comb filter C26 circuitry can be chosen to suppress remnant demodulation artifacts by relying on correlation in the vertical direction. Consider how such a design decision can be further implemented.

If the sound carrier of a co-channel interfering analog TV signal is not suppressed by SAW filtering or a sound trap in the IF amplifier chain 12, the NTSC-rejection comb filter B20 and the postcoding comb filter B26 circuitry are advantageously chosen to be of types like the NTSC-rejection comb filter 120 and the postcoding comb filter 126 circuitry of FIG. 3. If the sound carrier of a co-channel interfering analog TV signal is suppressed by SAW filtering or a sound trap in the IF amplifier chain 12, the NTSC-rejection comb filter B20 and the postcoding comb filter B26 circuitry are advantageously chosen to be of types like the NTSC-rejection comb filter 220 and the postcoding comb filter 226 circuitry of FIG. 4. This is because the anti-correlation between video components only six symbol epochs away from each other is usually better than the correlation between video components twelve symbol epochs away from each other.

The optimal choice of the NTSC-rejection comb filter C20 and the postcoding comb filter C26 circuitry is less straightforward, because of the choice one must make (in consideration of field interlace in the interfering analog TV signal) whether to choose the temporally closer scan line in the same field or the spatially closer line in the preceding field to be combined with the current scan line in the NTSC-rejection comb filter C20. Choosing the temporally closer scan line in the same field is generally the better choice, since jump cuts between fields are less likely to ravage NTSC rejection by the comb filter C20. With such choice, the NTSC-rejection comb filter C20 and the postcoding comb filter C26 circuitry are of types like the NTSC-rejection comb filter 320 and the postcoding comb filter 326 circuitry of FIG. 5. With the other choice instead, the NTSC-rejection comb filter C20 and the postcoding comb filter C26 circuitry are of types like the NTSC-rejection comb filter 420 and the postcoding comb filter 426 circuitry of FIG. 6.

The FIG. 9 digital receiver apparatus is modified in yet other embodiments of the invention to use additional parallel data-slicing operations, each carried out by a cascade connection of respective NTSC-rejection filter followed by a respective even-level data-slicer followed by a respective postcoding comb filter. While two additional parallel data-slicing operations are shown in FIG. 9, modifications to use still further parallel data-slicing operations can provide capability for refining the best estimate of correct symbol decoding result still further.

In preferred embodiments of the FIG. 9 circuitry the symbol decoding selection circuitry 66 selects ideal decoding results as final decoding results when they are available. When it is established that NTSC co-channel interference does in fact obtain, differences between the interim symbol decoding results and the various postcoded symbol decoding results presumably are attributable to NTSC co-channel interference. Accordingly, the selection of the final decoding results by the symbol decoding selection circuitry 66 when ideal decoding results are not available can be based on comparing the various postcoded symbol decoding results with each other and with the interim decoding results.

The reason it is desirable initially to establish that NTSC co-channel interference does in fact obtain is that these differences among the various symbol decoding results can also arise during noisy reception conditions when "white" noise is of level sufficient to cause substantially more error in the postcoded symbol decoding results than in the interim decoding results. The fact that NTSC co-channel interference is present can be ascertained during data segments when field synchronization information occurs, using the technique described in U.S. Pat. No. 5,594,496 or similar techniques using different NTSC co-channel interference rejection filters. Preferably, however, the strength of NTSC co-channel interference is monitored on a continuous real-time basis so that changes in NTSC co-channel interference level owing to fading or to changes in video content can be taken into account.

FIG. 9 shows such monitoring being provided by measuring the level of 4.5 MHz intercarrier in the NTSC co-channel interference, as taught by the inventor in U.S. patent application Ser. No. 08/821,945 filed Mar. 21, 1997 and entitled "USING INTERCARRIER SIGNALS FOR DETECTING NTSC INTERFERENCE IN DIGITAL TV RECEIVERS". The DTV signal, as converted to IF by the "front end" electronics 10, is supplied to an IF amplifier chain 68 of quasi-parallel type for NTSC sound signals. The amplifier stages in the IF amplifier chain 68 for NTSC sound signals correspond to similar amplifier stages in the IF amplifier chain 12 for DTV signals, having substantially linear gain and having the same automatic gain control as the corresponding amplifier stages in the IF amplifier chain 12. The frequency selectivity of the IF amplifier chain 68 is such as to emphasize response within ±250 kHz of NTSC audio carrier and within ±250 kHz or so of NTSC video carrier. The filtering procedures to establish the frequency selectivity of the IF amplifier chain 68 can be carried out by SAW filtering in a UHF IF amplifier if plural-conversion receiver circuitry is used. The response of the IF amplifier chain 68 is supplied to an intercarrier detector 70 which uses the modulated NTSC video carrier as an exalted carrier for heterodyning the NTSC audio carrier to generate intercarrier sound intermediate-frequency signal with a 4.5 MHz carrier frequency. This intercarrier sound IF signal is amplified by an intercarrier-sound intermediate-frequency amplifier 72, which 4.5 MHz IF amplifier 72 supplies amplified intercarrier sound IF signal to an intercarrier amplitude detector 74. The response of the amplitude detector 74 is supplied to a threshold detector 76. The threshold in the threshold detector 76 is exceeded if the NTSC co-channel interference is of sufficient strength as to be likely to cause error in the data-slicing performed by the data-slicer 22. The threshold detector 76 supplies the symbol decoding selection circuitry 66 indication of whether or not the threshold is exceeded. If the indication is that the NTSC co-channel interference is not of sufficient strength as to be likely to cause error in the data-slicing performed by the data-slicer 22, this indication conditions the symbol decoding selection circuitry 66 to select interim symbol decoding results from the data-slicer 22 as final symbol decoding results, provided ideal symbol decoding results are not available for the current symbol epoch. The time constant in the intercarrier amplitude detector 74 should be carefully chosen if optimal performance is sought. Since isolated symbol decoding errors are correctable, short-pulse elimination of output signal from an intercarrier amplitude detector 74 with a fast time constant is likely to be preferred for generating a control signal for switching the selection of final symbol decoding results from interim symbol decoding results to postcoded symbol decoding results.

A variety of circuit arrangements are available for deriving intercarrier signal by heterodyne between the audio and video carriers of a co-channel interfering analog television signal. A number of such arrangements are disclosed in U.S. patent application Ser. No. 08/821,945.

Figure 10A:
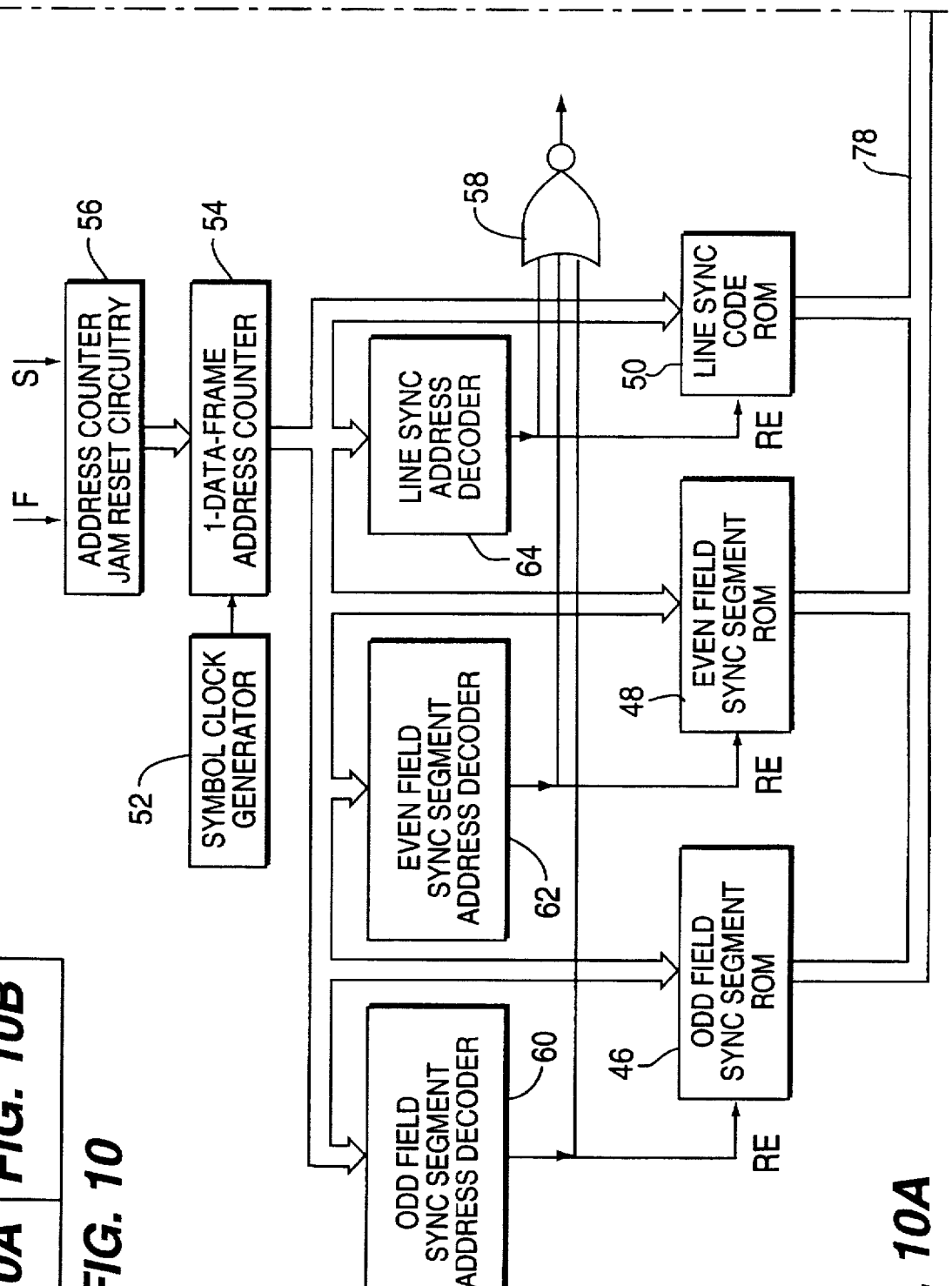
FIG. 10A is a block schematic diagram showing details of circuitry in the FIG. 9 digital television signal receiver for generating prescribed symbol decoding results during data synchronization intervals.
Figure 10B:
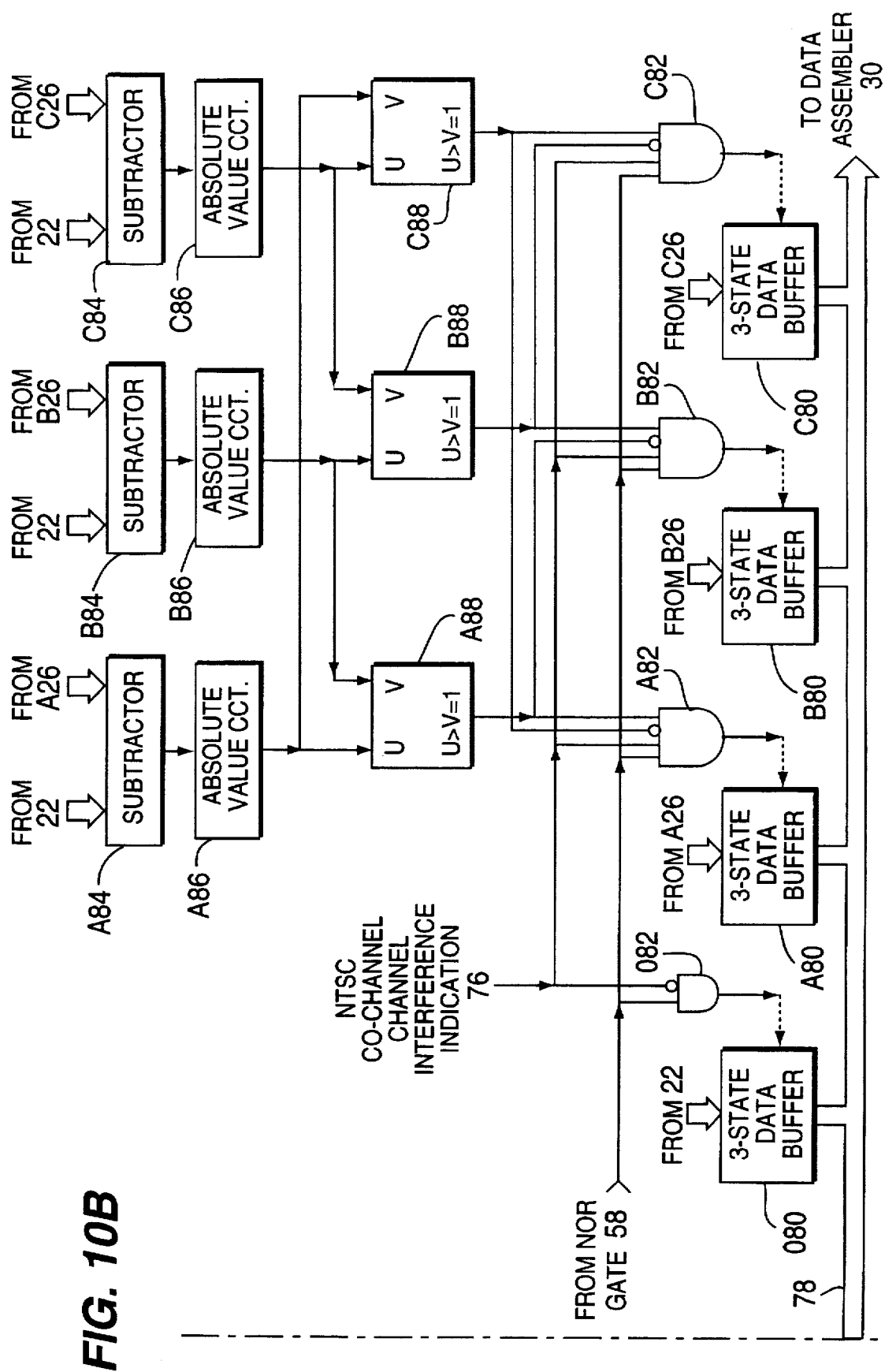
FIG. 10B is a block schematic diagram showing details of circuitry in the FIG. 9 digital television signal receiver including in accordance with a further aspect of the invention a further type of best-estimate-selection circuitry for selecting best estimates from various symbol decoding results, to generate final symbol decoding results at times between those times when synchronization codes occur.

FIGS. 10A and 10B show in some detail circuitry included within the symbol decoding selection circuitry 66 for selecting final symbol decoding results. FIG. 10 is an assembly diagram showing how FIGS. 10A and 10B can be fitted together to provide a complete block schematic diagram of the symbol decoding selection circuitry 66. The symbol decoding selection circuitry 66 has a 3-bit-wide output data bus 78 that runs from the bottom of FIG. 10A to the bottom of FIG. 10B and thence to the beginning of a cascade connection of data assembler 30, data interleaver 32, trellis decoder circuitry 34, data de-interleaver 36, byte building circuitry 38, Reed-Solomon decoder circuitry 40 and data de-randomizer 42 similar to that shown in FIG. 1. FIG. 10A shows circuitry similar to that shown in FIG. 8 for selectively applying ideal symbol decoding results read from ROMs 46, 48 and 50 to the output data bus 78.

FIG. 10B shows best-estimate-selection circuitry for selecting final symbol decoding results during time intervals when ideal symbol decoding results are unavailable, that is time intervals between those in which data segment or data field synchronizing codes are supplied in the DTV signal. The tri-state data buffer 2611 and the multiplexer 2612 of FIG. 8 are replaced by tri-state data buffers O80, A80, B80 and C80 in the FIG. 10B best-estimate-selection circuitry. The tri-state data buffer O80 is conditioned by the response of an AND gate O82 being logic ONE to assert the interim symbol decoding results supplied from the odd-level data-slicer 22 of FIG. 9 on the output data bus 78. The ti-state data buffer A80 is conditioned by the response of an AND gate A82 being logic ONE to assert the postcoded symbol decoding results supplied from the postcoding comb filter A26 of FIG. 9 on the output data bus 78. The tri-state data buffer B80 is conditioned by the response of an AND gate B82 being logic ONE to assert the postcoded symbol decoding results supplied from the postcoding comb filter B26 of FIG. 9 on the output data bus 78. The tri-state data buffer C80 is conditioned by the response of an AND gate C82 being logic ONE to assert the postcoded symbol decoding results supplied from the postcoding comb filter C26 of FIG. 9 on the output data bus 78. The NOR gate 58 of FIG. 10A supplies its response to the AND gates O82, A82, B82 and C82 as respective inputs to each of them, so the ti-state buffers O80, A80, B80 and C80 may be conditioned to exhibit low source impedances to the bit lines of the output data bus 78 only when ideal symbol decoding results are not being asserted on the date bus 78 by any one of the tri-state output buffers of the ROMs 46, 48 and 50.

The output signal from the FIG. 9 threshold detector 76 is a logic ONE when the NTSC co-channel interference is of sufficient strength to cause error in the data-slicing performed by the data-slicer 22. The output signal from the FIG. 9 threshold detector 76 is applied as a respective input signal to each of the AND gates A82, B82 and C82, so the tri-state buffers A80, B80 and C80 may be conditioned to exhibit low source impedances to the bit lines of the output data bus 78 only when the NTSC co-channel interference is of sufficient strength to cause error in the data-slicing performed by the data-slicer 22. The output signal from the FIG. 9 threshold detector 76 is complemented before being applied as an input signal to the AND gate O82, so the tri-state buffer O80 may be conditioned to exhibit low source impedances to the bit lines of the output data bus 78 only when the NTSC co-channel interference is of insufficient strength to cause error in the data-slicing performed by the data-slicer 22.

Consider now how selection is made among the postcoded symbol decoding results supplied from the postcoding comb filters A26, B26 and C26 of FIG. 9 when the output signal from the FIG. 9 threshold detector 76 is a logic ONE, indicating that the NTSC co-channel interference is of sufficient strength to cause error in the interim symbol decoding results supplied by the data-slicer 22. The postcoded symbol decoding result that departs most from the interim symbol decoding result in absolute terms is presumed to exhibit such absolute departure because the comb filtering used to achieve that postcoded symbol decoding result has been more effective in suppressing the NTSC co-channel interference artifact than the comb filtering used to achieve the other postcoded symbol decoding results. Accordingly, the differences between the interim symbol decoding result supplied by the data-slicer 22 and the postcoded symbol decoding results supplied by the postcoding comb filters A26, B26 and C26 are determined by the digital subtractors A84, B84 and C84 of FIG. 10B. The absolute values of these differences are determined by absolute-value circuits A86, B86 and C86, to determine the absolute departures of the postcoded symbol decoding results supplied from the postcoding comb filters A26, B26 and C26 from the interim symbol decoding result supplied by the data-slicer 22. The absolute-value circuits A86, B86 and C86 may be realized using read-only memories (ROMs) to achieve better calculation speed than by selectively bit-complementing and adding ONE. Even better calculation speed can be achieved by using ROMs to carry out both the subtraction and absolute-value procedures simultaneously.

The FIG. 10B best-estimate-selection circuitry includes digital comparators A88, B88 and C88 in addition to the tri-state buffers O80, A80, B80 and C80 and in addition to the AND gates O82, A82, B82 and C82. The digital comparator A88 determines whether the absolute departure from the interim symbol decoding result of the postcoded symbol decoding result supplied by the postcoding comb filter A26 equals or exceeds the absolute departure from the interim symbol decoding result of the postcoded symbol decoding result supplied by the postcoding comb filter B26, supplying a logic ONE if it does and a logic ZERO if it does not. The digital comparator B88 determines whether the absolute departure from the interim symbol decoding result of the postcoded symbol decoding result supplied by the postcoding comb filter B26 exceeds the absolute departure from the interim symbol decoding result of the postcoded symbol decoding result supplied by the postcoding comb filter C26, supplying a logic ONE if it does and a logic ZERO if it does not. A digital comparator C88 determines whether the absolute departure from the interim symbol decoding result of the postcoded symbol decoding result supplied by the postcoding comb filter C26 exceeds the absolute departure from the interim symbol decoding result of the postcoded symbol decoding result supplied by the postcoding comb filter A26, supplying a logic ONE if it does and a logic ZERO if it does not.

In order for the AND gate A82 response to be a logic ONE for conditioning the tri-state buffer A80 to assert the postcoded symbol decoding result supplied by the postcoding comb filter A26 on the output data bus 78, the digital comparator A88 must determine that the absolute departure from the interim symbol decoding result of the postcoded symbol decoding result supplied by the postcoding comb filter A26 equals or exceeds the absolute departure from the interim symbol decoding result of the postcoded symbol decoding result supplied by the postcoding comb filter B26 at the same time that the digital comparator C88 determines that the departure from the interim symbol decoding result of the postcoded symbol decoding result supplied by the postcoding comb filter C26 does not exceed the departure from the interim symbol decoding result of the postcoded symbol decoding result supplied by the postcoding comb filter A26. In order for the AND gate B82 response to be a logic ONE for conditioning the tri-state buffer B80 to assert the postcoded symbol decoding result supplied by the postcoding comb filter B26 on the output data bus 78, the digital comparator B88 must determine that the absolute departure from the interim symbol decoding result of the postcoded symbol decoding result supplied by the postcoding comb filter B26 exceeds the absolute departure from the interim symbol decoding result of the postcoded symbol decoding result supplied by the postcoding comb filter C26 at the same time that the digital comparator A88 determines that the absolute departure from the interim symbol decoding result of the postcoded symbol decoding result supplied by the postcoding comb filter A26 does not equal or exceed the departure from the interim symbol decoding result of the postcoded symbol decoding result supplied by the postcoding comb filter B26. In order for the AND gate C82 response to be a logic ONE for conditioning the tri-state buffer C80 to assert the postcoded symbol decoding result supplied by the postcoding comb filter C26 on the output data bus 78, the digital comparator C88 must determine that the absolute departure from the interim symbol decoding result of the postcoded symbol decoding result supplied by the postcoding comb filter C26 equals or exceeds the absolute departure from the interim symbol decoding result of the postcoded symbol decoding result supplied by the postcoding comb filter A26 at the same time that the digital comparator B88 determines that the departure from the interim symbol decoding result of the postcoded symbol decoding result supplied by the postcoding comb filter B26 does not exceed the departure from the interim symbol decoding result of the postcoded symbol decoding result supplied by the postcoding comb filter C26. One and only one of the comparators A88, B88 and C88 (the comparator A88 in FIG. 10B) is made to supply a logic ONE when its two respective inputs are equal in value, to avoid a condition in which none of the tri-state data buffers A80, B80 and C80 can be conditioned to drive the bit lines of the output data bus 78 from low source impedances owing to the absolute departures supplied from the absolute-value circuits A86, B86 and C86 all being equal.

One skilled in the art of digital communications receiver design and acquainted with the foregoing specification and its drawing will be enabled to design many embodiments of the invention other than the preferred ones specifically described. This should be borne in mind when construing the scope of the broader claims which follow. In the claims which follow, the word "said" is used whenever reference is made to an antecedent, and the word "the" is used for grammatical purposes other than to refer back to an antecedent.

What is claimed is:

1. A digital television signal receiver comprising:

digital television signal detection apparatus for supplying a stream of 2N-level symbols each having a symbol epoch of a specified length in time, N being a positive integer, said stream of 2N-level symbols susceptible to being accompanied by artifacts of co-channel interfering analog television signal, said symbols being grouped into successive data segments with respective headers of data segment synchronization code, said data segments being grouped into successive data fields with the initial data segment of each data field containing a data field synchronization code which changes from data field to data field;

circuitry for providing a number M of unique comb filter responses to said stream of 2N-level symbols, each said unique comb filter response being less susceptible to being accompanied by artifacts of co-channel interfering analog television signal than said stream of 2N-level symbols;

a plurality of symbol decoders for generating respective estimated symbol decoding results, a first of said plurality of symbol decoders generating first estimated symbol decoding results responsive to said stream of 2N-level symbols, each other of said plurality of symbol decoders generating respective estimated symbol decoding results responsive to a respective one of said M unique comb filter responses, which respective estimated symbol decoding results are postcoded to complete respective matched filtering for said respective one of said M unique comb filter responses from which said respective estimated symbol decoding results are obtained, said other of said plurality of symbol decoders including a second symbol decoder for generating second estimated symbol decoding results;

circuitry for detecting whether or not there currently is departure between said first and second estimated symbol decoding results; and best-estimate-selection circuitry for selecting best estimates from said respective estimated symbol decoding results to generate final symbol decoding results at times between those times when synchronization codes occur, the selection of said best estimates depending on the departures from said first estimated symbol decoding results of other estimated symbol decoding results.

2. The digital television signal receiver set forth in claim 1, further comprising:

trellis decoder circuitry responsive to final symbol decoding results for generating inner error-correction decoding results; and Reed-Solomon decoder circuitry responsive to bytes of said inner error-correction decoding results for generating outer error-correction decoding results.

3. The digital television signal receiver set forth in claim 1, wherein M is one.

4. The digital television signal receiver set forth in claim 3, wherein said best-estimate-selection circuitry comprises:

a multiplexer connected to provide the capability of selecting between said first and second estimated symbol decoding results for generating said final symbol decoding results at times between those times when said synchronization codes occur;

circuitry for developing absolute measures of the departures between said first and second estimated symbol decoding results;

a mean averager for generating the mean average of said absolute measures; and a threshold detector, responsive to said mean average of said squaring results exceeding a prescribed threshold value for conditioning said multiplexer for selecting said second estimated symbol decoding results to generate said final symbol decoding results at times between those times when said synchronization codes occur, and otherwise conditioning said multiplexer for selecting said first estimated symbol decoding results to generate said final symbol decoding results at times between those times when said synchronization codes occur.

5. The digital television signal receiver s et forth in claim 3, wherein said best-estimate-selection circuitry comprises:

a multiplexer connected to provide the capability of selecting between said first and second estimated symbol decoding results for generating said final symbol decoding results at times between those times when said synchronization codes occur;

a squarer for the departures between said first and second estimated symbol decoding results, for developing squaring results as an absolute measure of those departures;

a mean averager for generating the mean average of said squaring results; and a threshold detector, responsive to said mean average of said squaring results exceeding a prescribed threshold value for conditioning said multiplexer for selecting said second estimated symbol decoding results to generate said final symbol decoding results at times between those times when said synchronization codes occur, and otherwise conditioning said multiplexer for selecting said first estimated symbol decoding results to generate said final symbol decoding results at times between those times when said synchronization codes occur.

6. The digital television signal receiver set forth in claim 5, further comprising:

trellis decoder circuitry responsive to final symbol decoding results for generating inner error-correction decoding results; and Reed-Solomon decoder circuitry responsive to bytes of said inner error-correction decoding results for generating outer error-correction decoding results.

7. The digital television signal receiver set forth in claim 1, wherein M is at least two.

8. The digital television signal receiver set forth in claim 7, further comprising:

circuitry for determining whether or not said co-channel interfering analog television signal is currently of sufficient level as to give rise to error in said first estimated symbol decoding results, for providing a first indication when said co-channel interfering analog television signal is determined not to be of sufficient level as to give rise to error in said first estimated symbol decoding results, and for providing a second indication when said co-channel interfering analog television signal is determined to be of sufficient level as to give rise to error in said first estimated symbol decoding results; and, within said best-estimate-selection circuitry; and circuitry responsive to said first indication for currently selecting said best estimates solely from said first estimated symbol decoding results, for generating said final symbol decoding results at times between those times when said synchronization codes occur.

9. The digital television signal receiver set forth in claim 8, wherein said best-estimate-selection circuitry further comprises:

circuitry for determining which of the departures from said first estimated symbol decoding results of other estimated symbol decoding results has the largest absolute value, to generate an indication of which other estimated symbol decoding result is least likely to be in error caused by said artifacts of co-channel interfering analog television signal; and circuitry responsive to said indication of which other estimated symbol decoding results are least likely to be in error owing to said artifacts of co-channel interfering analog television signal, when and only when said second indication is concurrently provided, to select said best estimates from said other estimated symbol decoding results so indicated to be least likely to be in error owing to said artifacts of co-channel interfering analog television signal, for generating said final symbol decoding results at times between those times when said synchronization codes occur.

10. The digital television signal receiver set forth in claim 7, further comprising:

circuitry for deriving intercarrier signal from the heterodyne between the audio and video carriers of said co-channel interfering analog television signal;

circuitry for detecting when the amplitude of such intercarrier signal exceeds a prescribed level, for furnishing an indication that said co-channel interfering analog television signal is of sufficient level as to give rise to error in said first estimated symbol decoding results generated by said first symbol decoder, and for otherwise furnishing an indication that said co-channel interfering analog television signal is of insufficient level as to give rise to error in said first estimated symbol decoding results; and, within said best-estimate-selection circuitry; and circuitry which is responsive to said indication that said co-channel interfering analog television signal is of insufficient level as to give rise to error in said first estimated symbol decoding results for causing said best estimates currently to be selected solely from said first estimated symbol decoding results.

11. The digital television signal receiver set forth in claim 10, wherein said best-estimate-selection circuitry further comprises:

circuitry for determining which of the departures from said first estimated symbol decoding results of other estimated symbol decoding results has the largest absolute value, to generate an indication of which other estimated symbol decoding result is least likely to be in error caused by said artifacts of co-channel interfering analog television signal; and circuitry responsive to said indication of which other estimated symbol decoding results are least likely to be in error owing to said artifacts of co-channel interfering analog television signal, when and only when said second indication is concurrently provided, to select said best estimates from said other estimated symbol decoding results so indicated to be least likely to be in error owing to said artifacts of co-channel interfering analog television signal, for generating said final symbol decoding results at times between those times when said synchronization codes occur.

12. A digital television signal receiver comprising:

digital television signal detection apparatus for supplying a stream of 2N-level symbols each having a symbol epoch of a specified length in time, N being a positive integer, said stream of 2N-level symbols susceptible to being accompanied by artifacts of co-channel interfering analog television signal, said symbols being grouped into successive data segments with respective headers of data segment synchronization code, said data segments being grouped into successive data fields with the initial data segment of each data field containing a data field synchronization code which changes from data field to data field;

a first symbol decoder generating first estimated symbol decoding results responsive to said stream of 2N-level symbols;

circuitry for providing a plurality of unique comb filter responses to said stream of 2N-level symbols, each said unique comb filter response being less susceptible to being accompanied by artifacts of co-channel interfering analog television signal than said stream of 2N-level symbols;

a respective symbol decoder responsive to each respective one of said plurality of unique comb filter responses for generating respective estimated symbol decoding results, which respective estimated symbol decoding results are postcoded to complete respective matched filtering for said respective one of said unique comb filter responses from which said respective estimated symbol decoding results are obtained;

circuitry for deriving intercarrier signal from the heterodyne between the audio and video carriers of said co-channel interfering analog television signal;

circuitry for detecting when the amplitude of such intercarrier signal exceeds a prescribed level, for furnishing an indication that said co-channel interfering analog television signal is of sufficient level as to give rise to error in said first estimated symbol decoding results generated by said first symbol decoder, and for otherwise furnishing an indication that said co-channel interfering analog television signal is of insufficient level as to give rise to error in said first estimated symbol decoding results;

circuitry for detecting the presence of synchronization codes in said stream of 2N-level symbols, for supplying indications of the presence of synchronization codes in said stream of 2N-level symbols, and for supplying an indication of the absence of synchronization codes in said stream of 2N-level symbols;

circuitry responsive to the presence of synchronization codes in said stream of 2N-level symbols being detected for generating ideal symbol decoding results for said synchronization codes;

circuitry for determining which of said estimated symbol decoding results other than said first estimated symbol decoding result currently has the largest absolute departure from said first estimated symbol decoding result, to generate indications of which of said other estimated symbol decoding results is least likely to be in error caused by said artifacts of co-channel interfering analog television signal;

a multiplexer for providing final symbol decoding results by reproducing a currently selected one of a plurality of input signals supplied thereto, said plurality of input signals including said first estimated symbol decoding results, each said other estimated symbol decoding results and said ideal symbol decoding results; said multiplexer selectively being conditioned to provide said final symbol decoding results by reproducing said ideal symbol decoding results in response to said indications of the presence of synchronization codes in said stream of 2N-level symbols; said multiplexer selectively being conditioned to provide said final symbol decoding results by reproducing said first symbol decoding results, in response to the concurrent provision of said indication of the absence of synchronization codes in said stream of 2N-level symbols and said indication that said co-channel interfering analog television signal is of insufficient level as to give rise to error in said first estimated symbol decoding results; and said multiplexer being selectively conditioned to provide said final symbol decoding results by reproducing said other estimated symbol decoding result that is least likely to be in error caused by said artifacts of co-channel interfering analog television signal, in response to the concurrent provision of said indication of the absence of synchronization codes in said stream of 2N-level symbols, said indication that said co-channel interfering analog television signal is of sufficient level as to give rise to error in said first estimated symbol decoding results, and said indication of which of said other estimated symbol decoding results is least likely to be in error caused by said artifacts of co-channel interfering analog television signal.

13. The digital television signal receiver set forth in claim 12, further comprising:

trellis decoder circuitry responsive to final symbol decoding results for generating inner error-correction decoding results; and Reed-Solomon decoder circuitry responsive to bytes of said inner error-correction decoding results for generating outer error-correction decoding results.

14. A digital television signal receiver comprising:

digital television signal detection apparatus for supplying a stream of 2N-level symbols each having a symbol epoch of a specified length in time, N being a positive integer, said stream of 2N-level symbols susceptible to being accompanied by artifacts of co-channel interfering analog television signal, said symbols being grouped into successive data segments with respective headers of data segment synchronization code, said data segments being grouped into successive data fields with the initial data segment of each data field containing a data field synchronization code which changes from data field to data field;

a first symbol decoder generating first estimated symbol decoding results responsive to said stream of 2N-level symbols;

circuitry for providing first, second and third unique comb filter responses to said stream of 2N-level symbols, each said unique comb filter response being less susceptible to being accompanied by artifacts of co-channel interfering analog television signal than said stream of 2N-level symbols;

a second symbol decoder responsive to said first comb filter response for generating second estimated symbol decoding results, said second symbol decoder including a first postcoding comb filter for supplying said second estimated symbol decoding results in matched filter response to said first comb filter response;

a third symbol decoder responsive to said second comb filter response for generating third estimated symbol decoding results, said third symbol decoder including a second postcoding comb filter for supplying said third estimated symbol decoding results in matched filter response to said second comb filter response;

a fourth symbol decoder responsive to said third comb filter response for generating fourth estimated symbol decoding results, said fourth symbol decoder including a third postcoding comb filter for supplying said fourth estimated symbol decoding results in matched filter response to said third comb filter response;

circuitry for deriving intercarrier signal from the heterodyne between the audio and video carriers of said co-channel interfering analog television signal;

circuitry for detecting when the amplitude of such intercarrier signal exceeds a prescribed level, for furnishing an indication that said co-channel interfering analog television signal is of sufficient level as to give rise to error in said first estimated symbol decoding results generated by said first symbol decoder, and for otherwise furnishing an indication that said co-channel interfering analog television signal is of insufficient level as to give rise to error in said first estimated symbol decoding results;

circuitry for detecting the presence of synchronization codes in said stream of 2N-level symbols, for supplying indications of the presence of synchronization codes in said stream of 2N-level symbols, and for supplying an indication of the absence of synchronization codes in said stream of 2N-level symbols;

circuitry responsive to the presence of synchronization codes in said stream of 2N-level symbols being detected for generating ideal symbol decoding results for said synchronization codes;

means for determining which of said second, third and fourth estimated symbol decoding results currently has the largest absolute departure from said first estimated symbol decoding result, to generate indications of which of said second, third and fourth estimated symbol decoding results is least likely to be in error caused by said artifacts of co-channel interfering analog television signal;

a multiplexer for providing final symbol decoding results by reproducing a currently selected one of a plurality of input signals supplied thereto, said plurality of input signals including said first estimated symbol decoding results, said second estimated symbol decoding results, said third estimated symbol decoding results, said fourth estimated symbol decoding results and said ideal symbol decoding results; said multiplexer selectively being conditioned to provide said final symbol decoding results by reproducing said ideal symbol decoding results in response to said indications of the presence of synchronization codes in said stream of 2N-level symbols; said multiplexer selectively being conditioned to provide said final symbol decoding results by reproducing said first symbol decoding results, in response to the concurrent provision of said indication of the absence of synchronization codes in said stream of 2N-level symbols and said indication that said co-channel interfering analog television signal is of insufficient level as to give rise to error in said first estimated symbol decoding results; said multiplexer being selectively conditioned to provide said final symbol decoding results by reproducing said second symbol decoding results, in response to the concurrent provision of said indication of the absence of synchronization codes in said stream of 2N-level symbols, said indication that said co-channel interfering analog television signal is of sufficient level as to give rise to error in said first estimated symbol decoding results, and said indication that said second estimated symbol decoding result is least likely to be in error caused by said artifacts of co-channel interfering analog television signal; said multiplexer being selectively conditioned to provide said final symbol decoding results by reproducing said third symbol decoding results, in response to the concurrent provision of said indication of the absence of synchronization codes in said stream of 2N-level symbols, said indication that said co-channel interfering analog television signal is of sufficient level as to give rise to error in said first estimated symbol decoding results, and said indication that said third estimated symbol decoding result is least likely to be in error caused by said artifacts of co-channel interfering analog television signal; and said multiplexer being selectively conditioned to provide said final symbol decoding results by reproducing said fourth symbol decoding results, in response to the concurrent provision of said indication of the absence of synchronization codes in said stream of 2N-level symbols, said indication that said co-channel interfering analog television signal is of sufficient level as to give rise to error in said first estimated symbol decoding results, and said indication that said fourth estimated symbol decoding result is least likely to be in error caused by said artifacts of co-channel interfering analog television signal.

15. The digital television signal receiver set forth in claim 14, further comprising:

trellis decoder circuitry responsive to final symbol decoding results for generating inner error-correction decoding results; and Reed-Solomon decoder circuitry responsive to bytes of said inner error-correction decoding results for generating outer error-correction decoding results.

* * * * *